(12) United States Patent
Lin et al.

(10) Patent No.: US 10,692,123 B1
(45) Date of Patent: Jun. 23, 2020

(54) SECURE CUSTOMIZATION AND ASSEMBLAGE SYSTEM FOR MULTI-PLATFORM PACKAGES

(71) Applicant: Amazon Technologies, Inc., Seattle, WA (US)

(72) Inventors: Jennifer Marie Lin, Seattle, WA (US); Adam Russell Bains, Seattle, WA (US); Pawan Chopra, Seattle, WA (US); Steven Duchscherer, Seattle, WA (US); Karan Narang, Seattle, WA (US); Madeleine North, Seattle, WA (US); Iliana C. Sach, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 436 days.

(21) Appl. No.: 15/595,584

(22) Filed: May 15, 2017

(51) Int. Cl.
*G06Q 30/00* (2012.01)
*G06Q 30/06* (2012.01)

(52) U.S. Cl.
CPC ..... *G06Q 30/0621* (2013.01); *G06Q 30/0607* (2013.01); *G06Q 30/0627* (2013.01); *G06Q 30/0631* (2013.01)

(58) Field of Classification Search
CPC .................................................. G06Q 30/06–08
USPC ................................................. 705/26.1–27.2
See application file for complete search history.

(56) References Cited

U.S. PATENT DOCUMENTS 10,275,819 B1 * 4/2019 Johnson ................. G06N 7/005

* cited by examiner

*Primary Examiner* — Ethan D Civan
(74) *Attorney, Agent, or Firm* — Lee & Hayes, P.C.

(57) ABSTRACT

An event driven computing system generates selected benefit packages that include benefits that are drawn from multiple marketplace platforms and diverse product categories while also protecting consumer information. The event driven computing system may include one or more list generation engines that are each built to generate curated lists of benefits associated with one or more corresponding benefit package programs. The event driven system may then pass the curated lists and an identifier associated with a recipient of the benefit package to a secure customization engine that personalizes the curated sets of benefits to individual consumers based on consumer data. The event driven system can then use the personalized sets of benefits to select benefits for inclusion in the benefit package that are individually tailored to the recipient.

13 Claims, 6 Drawing Sheets

Event 502

Membership: Pregnancy Benefit Package (7 of 9)   Consumer: 53DJ9S90

---

LIST GENERATION ENGINE 114

Catalogue Data 214

Retailer: AMAZON    Category: Newborn Guidebooks

| Title (Author) | Price | Stock | Ratings |
|---|---|---|---|
| *Bringing Home Baby* (by Teresa Franklin) | $27.00 | Yes | 3.7 |
| *Preparing a Home for a Child* (by Sarah Williams) | $17.89 | Overstock | 4.4 |
| *Dr. Bob's Third Trimester Guide* (by Bob Robertson) | $42.00 | No | 4.2 |
| ... | ... | ... | ... |
| ... | ... | ... | ... |
| *Modern Nesting* (by Joy Sungarden) | $23.30 | Yes | 4.8 |

Curated List 218

Pregnancy Benefit Package

1 of 9: Natal vitamins (1-3 months), pregnancy guidebooks, pregnancy magazine subscription, pregnancy support group memberships, pregnancy seminars, etc.
...
...

7 of 9: Natal vitamins (6-9 months), maternity clothes, Lamaze classes, newborn guidebooks, etc.
...

Benefit Rules 216

Pregnancy Benefit Package

Membership Rules:
* Each benefit package must have at least one book benefit and at least one vitamin benefit.

User 853DJ9S90 Rules:
* Child is a boy.
* Nothing green or yellow.
* Prefer brand name over generic vitamins.

---

Set of One or More Benefits 504

| Book Benefit (Score) | Vitamin Benefit (Score) |
|---|---|
| * BabyStrong (4.3) | * Preparing a Home... (4.8) |
| * Mother Nature Third Trimester (4.1) | * Modern Nesting (4.0) |
| * Generic Natal Pills (3.2) | * Bringing Home Baby (2.9) |

FIG. 5A

SECURE CUSTOMIZATION AND ASSEMBLAGE SYSTEM FOR MULTI-PLATFORM PACKAGES

BACKGROUND

Most marketplace transactions involve consumers selecting specific goods or services to purchase from a vendor. However, some consumers desire transactions where the vendor selects the particular goods or services that are to be provided on behalf of the consumer. Currently, most systems that enable consumers to purchase vendor selected goods or services use human curation to identify the collection of goods or services that are to be provided to the consumers. However, providing human curated goods or services that are specifically tailored to individual users is difficult to implement and manage on a large scale.

Additionally, while some current systems use algorithms to select goods or services for consumers, because of security constraints associated with protecting customer information, these systems are narrowly tailored to only select goods or services from a specific subset of goods or services (i.e., items of clothing, books, bottles of wine, etc.) and from a single marketplace platform. That is, to prevent consumer information from being exposed, current algorithmic systems are tightly designed to provide customized selections from a predetermined catalogue of goods or services provided by a marketplace platform.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
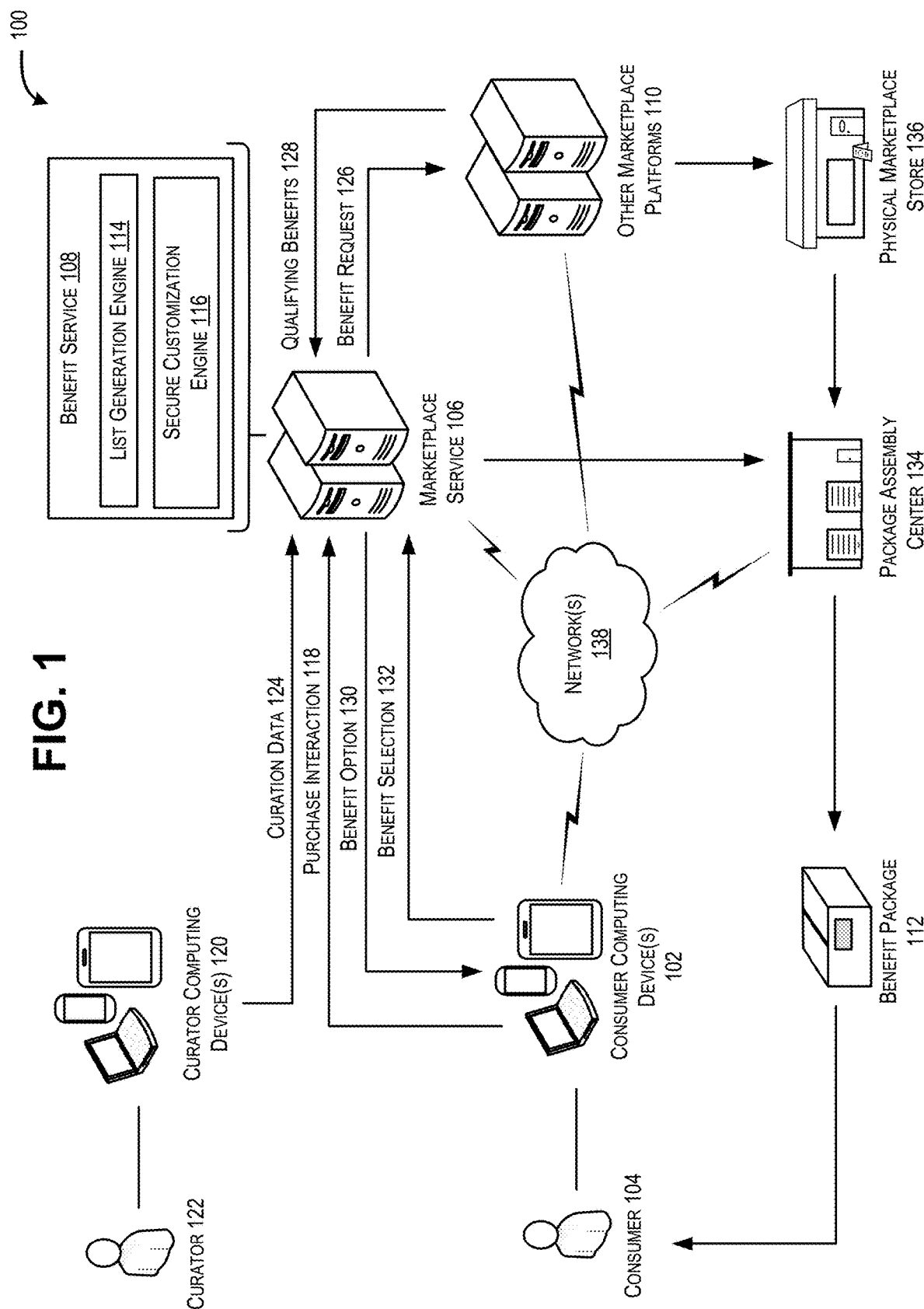
FIG. 1 is an illustrative environment for providing customized selected benefits to consumers while protecting consumer information.

This disclosure is generally directed to an event driven computing system for providing selected benefits. A benefit may include a physical good, a service, a digital good, a digital asset (e.g., access to a digital service), a reservation, a membership, a promotion, coupon, credit, or other consumable item or service. A benefit package may include a collection of one or more benefits that are provided to the consumer. The event driven computing system is capable of generating selected benefit packages that include benefits that are drawn from multiple marketplace platforms and diverse product categories while also protecting consumer information. For example, the benefits in a benefit package may be sourced from more than one marketplace platform (e.g., an online marketplace, a digital service platform, a physical merchant, a restaurant booking platform, etc.). In some embodiments, the curated set of benefits may be associated with a particular benefit package program. For example, for a STEM (Science Technology Engineering and Math) toy of the month club, the curated set of benefits may correspond to a set of STEM themed toys that have been chosen for the current month.

The event driven computing system may include a list generation engine for generating curated lists of benefits associated with one or more benefit package programs, and a secure customization engine that personalizes the curated sets of benefits to individual consumers based on consumer data. Upon detection of an event associated with a consumer, list generation engine may identify a curated list of benefits that may be provided to the consumer. An event may include an indicator that a consumer has purchased a selected benefit package, or an indicator that a pre-scheduled interval (e.g., one a day, twice a month, biannually, etc.) has occurred. An event may also include an indicator of an occurrence, such as a holiday, a consumer's birthday, a wedding, and anniversary, etc. For example, where a consumer has purchased a membership in a weekly benefit package program, at a set time each week the system may detect an event indicating that a new benefit package is to be provided to the consumer.

In some embodiments, identifying the curated list of benefits may correspond to the list generation engine accessing curated lists that have been input into the computing system via a curator, automatically generating curated lists, or a combination thereof. In some embodiments, the computing system may store benefit program data that identifies one or more rules for generating a curated list of benefits for the benefit program. For example, for a Portland soccer themed benefit program, the benefit program data may identify one or more rules such as (i) price of the benefit must be under $25, (ii) benefits produced in the pacific northwest are preferred, (iii) the benefit must be associated with a Portland college or professional soccer team, (iv) the benefits are to be provided by a combination of: amazon.com, etsy.com, mls.com, addidas.com, and ebay.com. Then, when the computing system detects an event associated with the Portland soccer themed membership, the benefit program generates a curated list of benefits based on the rules identified in the benefit program data. In some embodiments, the rules may be input by a benefit program manager for the particular benefit program. Alternatively, the rules may be input by a consumer during a purchase associated with the benefit program.

In some embodiments, the curated list of benefits may be generated based on curation data that identifies a schedule of benefits that may be provided to consumers from time to time, such as randomly, periodically at set intervals, etc. The schedule specified by the curation data may identify time periods during which particular benefits are to be provided (i.e., for the first three months after signing up, in the month of January, etc.). Alternatively or in addition, the schedule may be accomplishment driven, which may be determined using a feedback loop (i.e., the consumer has demonstrated mastery of a skill, academic progress, reading level, completion of a task, etc.). For example, the computing system may store curation data for a parenting benefit program that identifies a schedule that specifies set times during child development (e.g., prenatal vitamins during pregnancy, maternity clothes during the three months before a child's due date, infant formula appropriate for a 3-6 month old, etc.) that particular benefits are to be provided to the consumer.

The computing system then provides curated list of benefits and a consumer identifier to the secure customization engine, which determines a personalized set of benefits that are tailored to the consumer. The secure customization engine may use the consumer identifier to access consumer information (e.g., behavior information, profile information, past purchase information, demographic information, geographic information, stated and/or determined consumer preferences, etc.) associated with the consumer that is receiving the benefit package. In some embodiments, the actions of the secure customization engine may be independent of the list generation engine and/or benefit package program that is associated with the curated list of benefits. The secure customization engine may determine the personalized set of benefits based on the consumer information and the curated set of benefits.

For example, the secure customization engine may remove benefits that have previously been purchased by the consumer. The secure customization engine may also determine a predicted consumer interest in individual benefits based on the consumer information, and assign scores to individual benefits that correspond to the predicted level of interest in the benefit. Alternatively, where the set of benefits is already associated with a ranking, the customization engine may generate a personalized ranking for the consumer that is based on the predicted level of interest of the consumer in the individual benefits.

The computing system then selects from the personalized set of benefits, one or more benefits that are to be provided to the consumer in the benefits package. The computing system may select individual benefits based on a corresponding score, and/or a ranking of the one or more benefits. The computing system may select a present number of benefits for inclusion. Alternatively or in addition, the computing system may select the one or more benefits based on a number of other factors, such as total price of the benefits in the benefits package (i.e., less than a preset value, within a value range, etc.), a size of the container within which the benefits package is being shipped, a diversity of types of benefits within the benefit package (e.g., at least one physical item and one digital item), a required set of benefit categories, etc. For example, for new parents benefit package program, at three months from consumer's due date, the computing system may select the highest scored baby formula, the highest scored baby toy, and the two highest scored items of 3-6 month old baby clothes. In another example, for a date night package subscription, the computing system may select combination of a highly scored wine, a dessert, and the digital rights to watch a recommended movie, based at least in part on the benefits having a total value between $30 and $35. In some embodiments, the computing system may provide the consumer with an ability to select between two or more highly scored benefits, so that the consumer is able to choose the specific benefit that is to be included in the benefits package.

The computing system then generates one or more order documents for the selected one or more benefits. The computing system may transmit the order documents to individual merchants that are providing one or more goods to be included in the benefits package. Alternatively, the computing system may transmit an order identifier to the individual merchants that are providing one or more goods, and store the order documents in a location that is accessible to the individual merchants using the order identifier.

After the benefits package is sent to the consumer, the computing system may receive interaction information from a computing device associated with the consumer, with the benefits package, or both. For example, the computing device may receive an indication that the consumer has accessed a digital benefit via an application associated with the computing device. Alternatively or in addition, the benefits package may include a visual or alphanumeric code that can be scanned or entered before an account associated with the consumer is allowed to access a digital benefit. For example, a benefits package for a date-night subscription may include a printed quick response (QR) code that, when scanned by an application, allows an account associated with the consumer to watch a new release movie without being charged. In some embodiments, the digital benefit that is associated with the visual or alphanumeric code may not be determined until after the code is scanned or entered. For example, entering or scanning the code may cause the computing system to cause a computing device associated with the consumer to present a functionality to choose between two or more digital benefits that the consumer is to receive. Alternatively or in addition, in response to an entering or scanning of the code, the computing system may cause the secure customization engine to make a determination of one or more highly scored digital benefits for the consumer based on consumer information available at the time the code is entered or scanned. For example, if between the time of shipment of the benefits package and the time the consumer enters or scans the code the consumer has finished watching the television series "Firefly," the secure customization engine may cause a benefit of accessing the digital movie "Serenity" to be highly rated.

In some embodiments, the computing system may generate additional consumer information based on the interaction information. For example, if the consumer returns and/or never consumes a benefit, the computing system may cause the consumer preferences associated with the consumer to be adjusted accordingly. In another example, if interaction information indicates that a consumer who has purchased a subscription for learning to code has completed a task associated with a benefit package, such as an online lecture series on html programming, the computing system may cause a coding competency level associated with the consumer to be changed adjusted (e.g., from beginner to novice).

The techniques, apparatuses, and systems described herein may be implemented in a number of ways. Example implementations are provided below with reference to the following figures.

FIG. 1 is a schematic diagram of an illustrative environment 100 for providing customized selected benefits to consumers while protecting consumer information. The environment 100 includes the consumer computing device 102, and consumer 104 associated with consumer computing device 102. Consumer computing device 102 may include any type of device (e.g., a laptop computer, a tablet device, a mobile telephone, etc.), and which may include one or more processor(s), computer-readable media, and a display.

The environment 100 may also include marketplace service 106 that may host benefit service 108. Marketplace service 106 may be any entity, server(s), platform, etc., that offers items (e.g., products, services, etc.) for acquisition to consumers. For example, the marketplace service 106 may be associated with an electronic or merchant marketplace (e.g., a website, electronic application, widget, etc.) that allows consumers to search, browse, view and/or acquire (i.e., purchase, rent, lease, borrow, etc.) benefits offered for sale directly by the marketplace service 106 or offered for sale by the marketplace service 106 on behalf of other entities. The marketplace service 106 may also obtain/receive and maintain consumer information about actual or potential customers (e.g., consumers 106), etc., for the purpose of presenting the most relevant items, deals, recommendations, advertisements, etc.

The benefit service 108 may be a service that allows consumer 104 to purchase benefit package(s) 112 that include one or more benefits that are selected by the benefit service 108, and which are provided to the consumer via physical shipment, digital transfer, or a combination thereof. Benefit package 112 may be a physical package (e.g., box, letter, physical storage device, etc.), a digital package (e.g., email, text message, downloadable file, etc.), or a combination thereof. In some embodiments, the benefits in a benefit package may be obtained from more than one source (e.g., marketplace service 106, other market platforms 110, etc.). A benefit may include a physical good, a service, a digital good, a digital asset (e.g., access to a digital service), a reservation, a membership, a promotion, coupon, discount, etc. In some embodiments the benefit service 108 may offer memberships in benefit programs, where a benefit package having theme corresponding to the program is shipped to the consumer from time to time, such as at a particular cadence. For example, the benefit service 108 may offer a benefit program for young readers, where once a month (or at other times) members of the benefit program receive a new benefit package of benefits associated with learning to read (e.g., books, reading tools, games, videos, applications, etc.). After passage of some time, the members may receive another different benefit associated with learning to read.

The benefit service 108 may also include list generation engine 114 and secure customization engine 116. The list generation engine 114 may identify a curated set of benefits in response to the detection of an event associated with purchase interaction 118 corresponding to consumer 104. Purchase interaction 118 may correspond to consumer 104 having purchased and/or requested a vendor selected benefit package. The event may be associated with a onetime purchase/request by consumer 104, or a repeating purchase/request where benefits packages are to be provided at pre-scheduled intervals (e.g., once a day, twice a month, biannually, etc.). The event may also include an indicator of an non-purchase occurrence, such as a holiday, a consumer's birthday, a wedding, an anniversary, etc. For example, a consumer 104 may have requested that a benefit package 112 be provided to his spouse each year on their wedding anniversary. In some embodiments, the curated set of benefits may be associated with a particular membership program. For example, for a wine and cheese of the month club, the curated set of benefits may correspond to a set of seasonal cheeses and wines that can be provided to the consumer.

In some embodiments, the curated set of benefits may be determined by an input of one or more benefits that is received by the marketplace service. For example, the marketplace service 106 may receive a curation data 124 from a curator computing device 120 associated with a curator 122. The curation data 124 may include one or more of a curated list that identifies one or more benefits that are to be included in a curated set of benefits, one or more rules for generating the curated set of benefits. Alternatively or in addition, the set of benefits may be generated automatically by the list generation engine 114. For example, benefit service 108 may store membership data that identifies one or more rules for generating the curated set of benefits for the corresponding membership. For example, for a farmers market themed membership, the membership data may identify a first rule that the benefit must be an organic produce item produced within a threshold distance of a location associated with the consumer, and a second rule that the produce items that are in season for shorter periods are to be preferred over produce items that are in season for longer periods. In this way, when the benefit service 108 detects an event associated with the farmers market membership, the list generation engine 114 may generate a curated list of produce items to potentially provide to the consumer based on the rules identified in the membership data. In some embodiments, the rules may be input by a curator 122 for a corresponding membership via curation data 124. Alternatively, the rules may be input by consumer 104 during a purchase of a membership or individual benefit package 112.

In some embodiments, the curation data 124 may include a schedule that identifies benefits that may be provided to consumers at set intervals. The intervals may correspond to a benefit package progression (e.g., one or more benefits that may be included in a first package, second package, etc.), a benefit progression (e.g., a first benefit should only be provided when a second benefit has previously been provided), time periods at which particular benefits are to be provided (e.g., one or more benefits that may be provided in the first year of membership, in the month of January), or may be accomplishment driven (e.g., the consumer has transitioned from first grade to second grade, completed a video/game/course/task/project, etc.), or a combination thereof. For example, marketplace service 106 may store benefit schedule data for a benefit package for expecting parents that identifies benefits that are to be provided to the consumer at set times during pregnancy (e.g., prenatal vitamins required at different stages of pregnancy, maternity clothes during the third trimester, instructional baby books, etc.).

When generating the curated set of benefits, the marketplace service may transmit a benefit request 126 to one or more other marketplace platforms 110 for one or more qualifying benefits 128 to include in the curated set of benefits. In some embodiments, the benefit request 126 may include one or more rules that identify parameters for selecting qualifying benefits 128. Alternatively or in addition, the benefit request 126 may include one or more of a membership ID that corresponds to a selected benefit membership, a benefit category identifier, or other identifier that the other marketplace platforms 110 can use to identify qualifying benefits. In some embodiments, the qualifying benefits 128 may be ranked and/or scored by the other marketplace platforms 110.

In some embodiments, the list generation engine 114 may also score and/or rank benefits in the curated set of benefits. For example, the list generation engine 114 may score the benefits based on availability (e.g., a low score for an item having inventory restrictions or limitations, a higher score for an item that marketplace service 106 has a large inventory of, etc.), merchant input (e.g., merchant requests that one or more particular items be included in the program), benefit ratings/reviews, marketplace performance (e.g., popular items scored higher), benefit history (i.e., time the benefit was introduced, monthly performance metrics for the benefit), etc. Alternatively or in addition, the benefits in a curated set of benefits may be scored or ranked by curator 122. In some embodiments, the list generation engine 114 may select a set number of benefits, select benefits having a ranking and/or score above a threshold value, or a combination thereof, to be included in the curated set of benefits.

The benefit service 108 may then provide the curated set of benefits and a consumer identifier to secure customization engine. The secure customization engine 116 may then determines a personalized set of benefits that are tailored to consumer 104. The secure customization engine 116 may be able to securely access customer information (e.g., behavior information, profile information, past purchase information, demographic information, geographic information, stated and/or determined consumer preferences, etc.) hosted by marketplace service 106 that is not accessible to the list generation engine 114. The secure customization engine 116 may use the consumer identifier to securely access consumer information associated with the consumer 104 that is receiving the benefit package 112, may determine the personalized set of benefits based on the consumer information and the curated set of benefits. For example, the secure customization engine 116 may remove benefits that the consumer information indicates have been previously acquired by the consumer.

In some embodiments, secure customization engine 116 may score or rank one or more benefits of the curated set of benefits. For example, secure customization engine 116 may determine a predicted interest value for individual benefits based on the consumer information, and may assign scores to individual benefits that correspond to the predicted level of interest in the benefit. In some embodiments, secure customization engine 116 may apply a weight to the scores assigned to the curated set of benefits assigned by the list generation engine 114 based on the predicted level of interest in the benefit. In this way, the weighted score may be based on both rules, market factors, curator inputs, and consumer information, while only exposing consumer information to a secure engine. Secure customization engine 116 may then generate a personalized ranking of benefits in the curated set of benefits based on the predicted level of interest of the consumer in the individual benefits.

The benefit service 108 then selects one or more benefits that are to be provided to consumer 104 in the benefits package 112. The benefit service 108 may select individual benefits based on its corresponding score(s), and/or a ranking of the one or more benefits. In some embodiments, benefit service 108 may select a present number of benefits for inclusion in the benefits package 112 that is indicated in membership data associated with the corresponding membership. Alternatively or in addition, benefit service 108 may select the one or more benefits based on a number of other factors, such as total price of the benefits in the benefits package (i.e., less than a preset value, within a value range, etc.), a size of the container within which the benefits package is being shipped, a diversity of types of benefits within the benefit package (e.g., at least one physical item and one digital item), a required set of benefit categories, etc. For example, for a membership program for learning to play guitar, an initial benefit package may include the highest scored guitar, the highest scored instructional booklet, the highest scored online learning resource, the highest scored set of guitar picks, and the highest scored guitar strings. In some embodiments, the marketplace service 106 may provide, via consumer device 102, the consumer 104 with a benefit option 130 ability to select between two or more similar benefits that have been highly scored. In this way, consumer 104 may provide a benefit selection 132 corresponding to a specific benefit that is to be included in the benefits package 112.

FIG. 1 also illustrates package assembly center 134 where customized benefit package 112 may be assembled and shipped to consumer 104. In some embodiments, package assembly center 134 may receive the benefits that are to be included in the benefit package 112 from one or more platforms associated with marketplace service 106, physical marketplace stores 136 associated with other marketplace platforms, benefit warehouses, etc. In some embodiments, the package assembly center 134 may provide a physical item in the benefit package 112 that corresponds to a digital benefit. For example, the benefits package 112 may include a visual or alphanumeric code that must be scanned or entered before an account associated with the consumer is allowed to access a digital benefit. In other embodiments, the package assembly center 134 may be a digital service provider that transmits digital benefits packages 112 to consumers. Additionally, in some embodiments the benefit package 112 may be provided by marketplace service 106, other marketplace platforms 110, physical marketplace stores 136, or a combination thereof.

Figure 2:
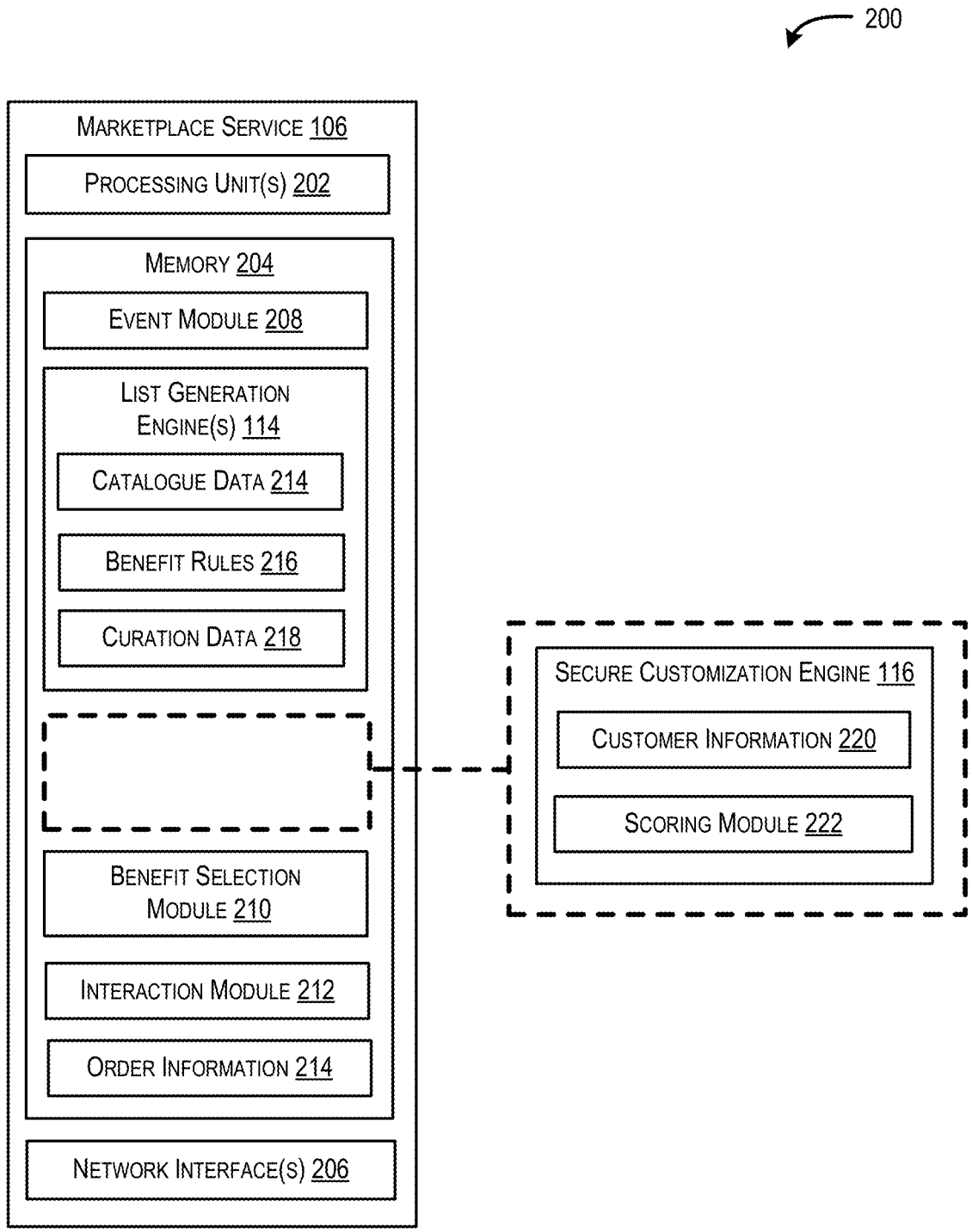
FIG. 2 is an illustrative computing architecture of the marketplace service shown in FIG. 1.

FIG. 2 is an illustrative computing architecture 200 of a marketplace service that identifies customized selected benefits while protecting consumer information. The computing architecture 200 may be used to implement the various systems, devices, and techniques discussed herein. In various embodiments, marketplace service 106 can be implemented or hosted by one or more servers, server farms, data centers, or any of the other computing devices listed above.

In the illustrated implementation, the computing architecture 200 includes one or more processing units 202 coupled to a memory 204. The computing architecture may also include a network interface 206. The marketplace service 106 can include an event module 208, one or more list generation engines 114, a benefit selection module 210, and an interaction module 124 stored in the memory 204. FIG. 2 further illustrates secure customization engine 116 as being separate from marketplace service 106. However in some embodiments, the secure customization engine 116 may be incorporated as a component of the secure customization engine 116. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with marketplace service 106 can be executed across multiple devices.

The event module 208 can be executable by the one or more processing units 106 to detect an event associated with a consumer. An event may correspond to an indicator that a consumer has purchased a vendor selected benefit package. Alternatively, an event may correspond to an indicator of an occurrence of a pre-scheduled interval (e.g., one a day, twice a month, biannually, etc.) at which a selected benefit package should be sent to a consumer. For example, where a consumer has purchased a membership in a weekly benefit package, the event module 208 will detect a corresponding event at a set time each week, and will trigger the marketplace service 106 to initiate the process of building a new benefit package for the consumer.

The list generation engine(s) 114 may identify a curated set of benefits in response to a detection of an event by the event module 208. In some embodiments, the curated set of benefits may be associated with a particular membership program. For example, for a wine and cheese of the month club, the curated set of benefits may correspond to a set of seasonal cheeses and wines that can be provided to the consumer. Additionally, there may be more than one list generation engine 114 stored on the marketplace service 106, with different list generation engines 114 corresponding to different selected benefit memberships. For example, a first list generation engine that is configured to identify a curated set of benefits for a wine and cheese of the month club, and a second list generation engine that is configured to identify a curated set of benefits for a STEM themed selected learning package for children. The individual list generation engine 114 that is triggered to generate a curated set of benefits may be selected based on a type of event detected by the event module 208.

The list generation engine(s) 114 may have access to catalogue data 214, benefit rules 216, and curation data 218. The catalogue data 214 may identify benefits offered by the marketplace service 106, and/or other marketplace platforms. The catalogue data 214 may include benefits that are offered, information about the benefits (e.g., descriptions, prices, current sales, etc.), availability of the benefits (e.g., amount in stock, seasonal availability, etc.), and as well as other benefit related information. The marketplace service 106 may receive and store catalogue data 214 from individual benefit providers that offer their goods for sale on an electronic marketplace hosted by the marketplace service 106. Alternatively or in addition, the catalogue data 214 may be stored by the individual benefit providers, and made available to the list generation 114 upon request (e.g., via an API for requesting the catalogue data 214).

The benefit rules 216 may include sets of one or more rules for generating corresponding curated set of benefits. For example, for a farmers market themed membership, the membership data may identify a first rule specifying that the benefit must be a food item produced within a threshold distance of a location associated with the purchasing consumer, and a second rule specifying that food items that are in season for shorter periods are to be preferred over food items that are in season for longer periods. In this way, when event module 208 detects an event associated with the farmers market membership, the list generation engine 114 may generate a curated list of produce items that may be provided to the consumer based on the corresponding benefit rules 216. The benefit rules 216 may be input by a curator for a corresponding membership, by a consumer during purchase of a membership or individual benefit package, or a combination thereof. For example, a curator may submit a set of rules that lay the foundational framework for selecting curated benefits for a membership. Then, as part of the purchasing process of the membership, the purchasing consumer may be given the opportunity to add or adjust one or more rules to tailor the membership to fit their personal preferences.

The curation data 218 may include one or more itemized lists of benefits that correspond to individual selected benefit package memberships. The curated lists may be input into the marketplace service 106 by a curator, may be generated automatically by the marketplace system, or a combination thereof. For example, for selected benefit package corresponding to a particular celebrity, the celebrity may periodically input a set of benefits that they would like to include in the package. In some embodiments, a first portion of a curated list may be input by a curator, and a second portion of the curated list may be generated by the marketplace service (e.g., using one or more benefit rules 2016). In some embodiments, the curation data 218 may specify a schedule of benefits that may be provided to consumers at set intervals of a membership. The intervals may correspond to a benefit package progression (e.g., one or more benefits that may be included in a first package, second package, etc.), a benefit progression (e.g., a first benefit should only be provided when a second benefit has previously been provided), time periods at which particular benefits are to be provided (e.g., one or more benefits that may be provided in the first year of membership, in the month of January), or may be accomplishment driven (e.g., the consumer has transitioned from first grade to second grade, completed a video/game/course/task/project, etc.), or a combination thereof.

In some embodiments, the list generation engine(s) 114 may determine the curated set of benefits based on the catalogue data 214, the benefit rules 216, and the curation data 218. For example, when generating the curated set of benefits, the list generation engine 114 access one or more of the benefit rules 216 and the curation data 218. In some embodiments, the list generation engine 114 may access the catalogue data 214 to determine a set of curated benefits that meet the criteria of the benefit rules 216 and the curation data 218. For example, where the curation data 218 identifies a benefit schedule for new parents, and the benefit schedule identifies infant formula as being an appropriate benefit, the list generation engine 114 may search the catalogue data 214 to identify benefits that correspond to infant formula. The list generation module may search the catalogued data using one or more of a membership ID that corresponds to a selected benefit membership, a benefit category identifier, or other identifier that identifies qualifying benefits.

In some embodiments, the qualifying benefits may be ranked and/or scored. For example, the benefits may be scored based on availability (e.g., a low score for an item experiencing a shortage, a higher score for an item that marketplace service 106 has an excess of, etc.), merchant input (e.g., merchant requests that one or more particular items be included in the program), benefit ratings/reviews, marketplace performance (e.g., popular items scored higher), benefit history (i.e., time the benefit was introduced, monthly performance metrics for the benefit), etc. The qualifying benefits may be ranked and/or scored by a curator, a benefit provider, list generation engine 114, or another element of marketplace service 106. In some embodiments, the list generation engine 114 may select a set number of benefits, select benefits having a ranking and/or score above a threshold value, or a combination thereof, to be included in the curated set of benefits.

The list generation engine 114 may then provide the curated set of benefits and a consumer identifier to secure customization engine(s) 116. For example, the marketplace service 106 may transmit an encrypted request to the secure customization engine 116 over a secure internet connection. The encrypted request may pass the curated set of benefits (e.g., as a calendar, ordered list, etc.) and the consumer identifier. The secure customization engine 116 may then determines a personalized set of benefits that are tailored to the consumer that is to receive the benefit package. The secure customization engine 116 may be stored in a secure portion of memory 204, or it may be stored on a separate secure computing device. In some embodiments, there may be more than one secure customization engine that are able to perform customization of curated benefit lists. For example, different customization engines may apply different evaluation techniques to determine the personalized sets of benefits.

In some embodiments, that marketplace service 106 may employ a centralized service that manages the permissions and or ability of different services to communicate or otherwise interact with other services. For example, the encrypted request may be passed over the secure internet connection to the centralized service, which is then is able to authenticate the identities of both the marketplace service 106 and the secure customization engine 116, authorize the passage of the encrypted request to the secure customization engine 116, and log the transmission of the secure request in a transmission log.

The secure customization engine 116 may be able to securely access customer information 222 (e.g., behavior information, profile information, past purchase information, demographic information, geographic information, stated and/or determined consumer preferences, etc.). In this way, the secure customization engine 116 may use the consumer identifier to securely access consumer information 220 associated with the consumer that is receiving the benefit package, and may determine the personalized set of benefits based on the consumer information and the curated set of benefits. For example, the secure customization engine 116 may remove benefits that the consumer information indicates have been previously acquired by the consumer.

In some embodiments, secure customization engine 116 may include a scoring module 222 that scores or ranks one or more benefits of the curated set of benefits. For example, scoring module 222 may determine a predicted interest value for individual benefits based on the consumer information, and assign scores and/or rank individual benefits according to the predicted level of interest in the benefit. In some embodiments, scoring module 222 may apply a weight to the scores assigned to the curated set of benefits assigned by the list generation engine 114 based on the predicted level of interest in the benefit. In this way, the weighted score may be based on both secure consumer data that is only accessible to the secure customization engine, and other data (e.g., the catalogue data 214, the benefit rules 216, and the curation data 218) that is accessible to the list generation engine 114. The secure customization engine 116 may then generate a personalized ranking of benefits in the curated set of benefits based on the predicted level of interest of the consumer in the individual benefits. In some embodiments, the personalized set of benefits may be provided to the marketplace service via a secure response passed via the secure internet connection.

The benefit selection module 210 can be executable by the one or more processing units 106 to receive the personalized set of benefits from the secure customization engine 116, and select the benefits that are to be included in the selected benefit package. The benefit selection module 210 may select individual benefits based on corresponding score(s), and/or a ranking of the personalized set of benefits. The benefit selection module 210 may select benefits based on a comparison between corresponding scores, by a comparison between a score and a threshold value, or a combination thereof. For example, the benefit selection module 210 may select the three benefits that have the highest corresponding score. In another example, the benefit selection module 210 may only select benefits that have a score that exceeds a threshold value. In some cases, this would mean that the benefit selection module 210 may determine that no benefits are to be provided to the consumer in situations where no benefit has been identified by the secure customization engine 116 as having a sufficient level of predicted consumer interest. In such situations, the marketplace service 106 may provide a consumer with a notification that no benefit package will be provided.

In some embodiments, benefit selection module 210 may select a present number of benefits for inclusion in the benefits package (e.g., a number indicated in membership data associated with the corresponding membership). Alternatively or in addition, benefit selection module 210 may select the one or more benefits based on a number of other factors, such as total price of the benefits in the benefits package (i.e., less than a preset value, within a value range, etc.), a size of the container within which the benefits package is being shipped, a diversity of types of benefits within the benefit package (e.g., at least one physical item and one digital item), a required set of benefit categories, etc. For example, for a STEM themed membership program for young children, the benefit selection module 210 may select a highest scored STEM themed toy, a highest scored STEM themed book, and two highly scored STEM themed videos.

The interaction module 212 can be executable by the one or more processing units 106 to transmit and receive interaction events with the consumer who purchased the consumer selected benefits package. For example, the interaction module 212 may provide a consumer (via electronic communication with a computing device associated with the consumer) with the ability to select between two or more similar benefits that have each been highly scored. The interaction module 212 may also receive feedback from the consumer about the benefit package. The feedback may include benefit reviews, package reviews, benefit ratings, returns of one or more benefits, cancellation of a membership, etc. The interaction module 212 may update the customer information 220 based on the interactions and/or feedback. For example, in response to the consumer submitting a negative review for a product, the interaction module 212 may adjust the consumer information 220 so that it better reflects the preferences of the server.

The marketplace service 106 may then generate order information 214 for the consumer benefit package. The marketplace service 106 may then transmit order information 214 to individual merchants and/or fulfillment centers that are providing one or more goods (e.g., other marketplace platforms 110). For example, the marketplace service 106 may provide an order document to a physical fulfillment center for the fulfillment of one or more physical goods, and to a digital fulfillment for fulfillment of one or more digital goods. In some embodiments, the order information 214 may include one or more order documents that identify the benefits that are to be provided in the benefit package, prices to be charged for individual benefits, providers that are to provide individual benefits, consumer billing information, a shipping address, etc. In this way, the order information 214 would allow the merchants and/or fulfillment centers to identify the benefits that are to be provided to the consumer, and determine how those benefits are to be provided to the consumer (i.e., shipped to a package assembly center, have digital access rights granted to a user account, emailed to a consumer, etc.). The order information may also include an order identifier that can be used to access an order document stored by the marketplace service 106. Alternatively, marketplace service 106 may transmit an order identifier to the individual merchants that are providing one or more goods, and store the order documents in a location that is accessible to the individual merchants using the order identifier.

Those skilled in the art will appreciate that the architecture described in association with marketplace service 106 is merely illustrative and is not intended to limit the scope of the present disclosure. In particular, the computing system and devices may include any combination of hardware or software that can perform the indicated functions, including computers, network devices, internet appliances, and/or other computing devices. The marketplace service 106 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The one or more processing unit(s) 202 may be configured to execute instructions, applications, or programs stored in the memory 204. In some examples, the one or more processing unit(s) 202 may include hardware processors that include, without limitation, a hardware central processing unit (CPU), a graphics processing unit (GPU), and so on. While in many instances the techniques are described herein as being performed by the one or more processing units 202, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 204 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer-executable instructions that, when executed by one or more processing units, cause various functions and/or operations described herein to be performed.

Additionally, a computer media includes data stored within a modulated data signal. For example, a computer media may include computer readable instructions, data structures, program modules, modulated carrier waves, other modulated transmission mechanisms, etc. However, as defined herein, computer storage media does not include communication media.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from marketplace service 106 may be transmitted to marketplace service 106 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Additionally, the network interface 206 includes physical and/or logical interfaces for connecting the respective computing device(s) to another computing device or network. For example, the network interface 206 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 3:
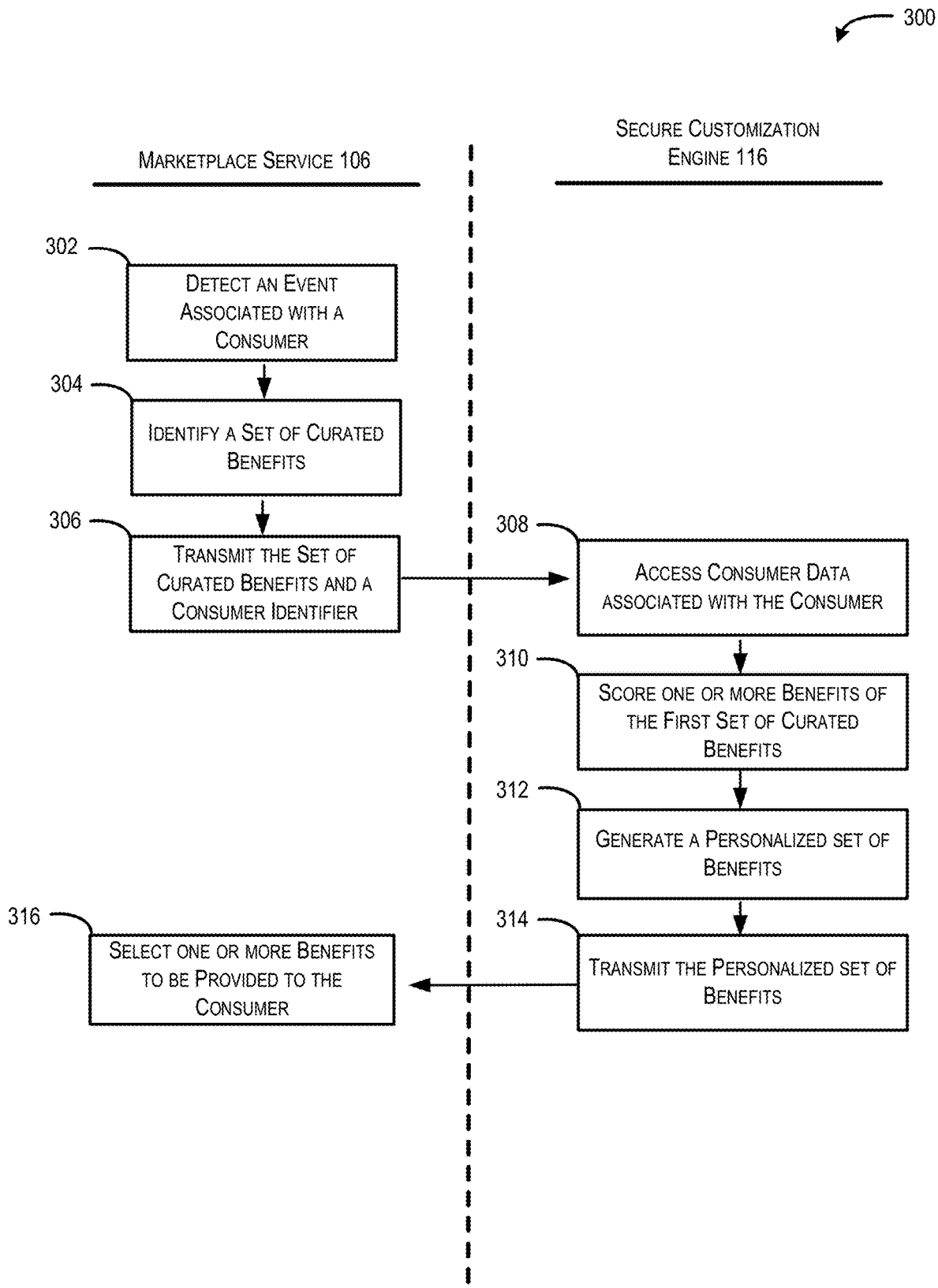
FIG. 3 is a flow diagram of an illustrative process for identifying customized selected benefits while protecting consumer information.
Figure 4:
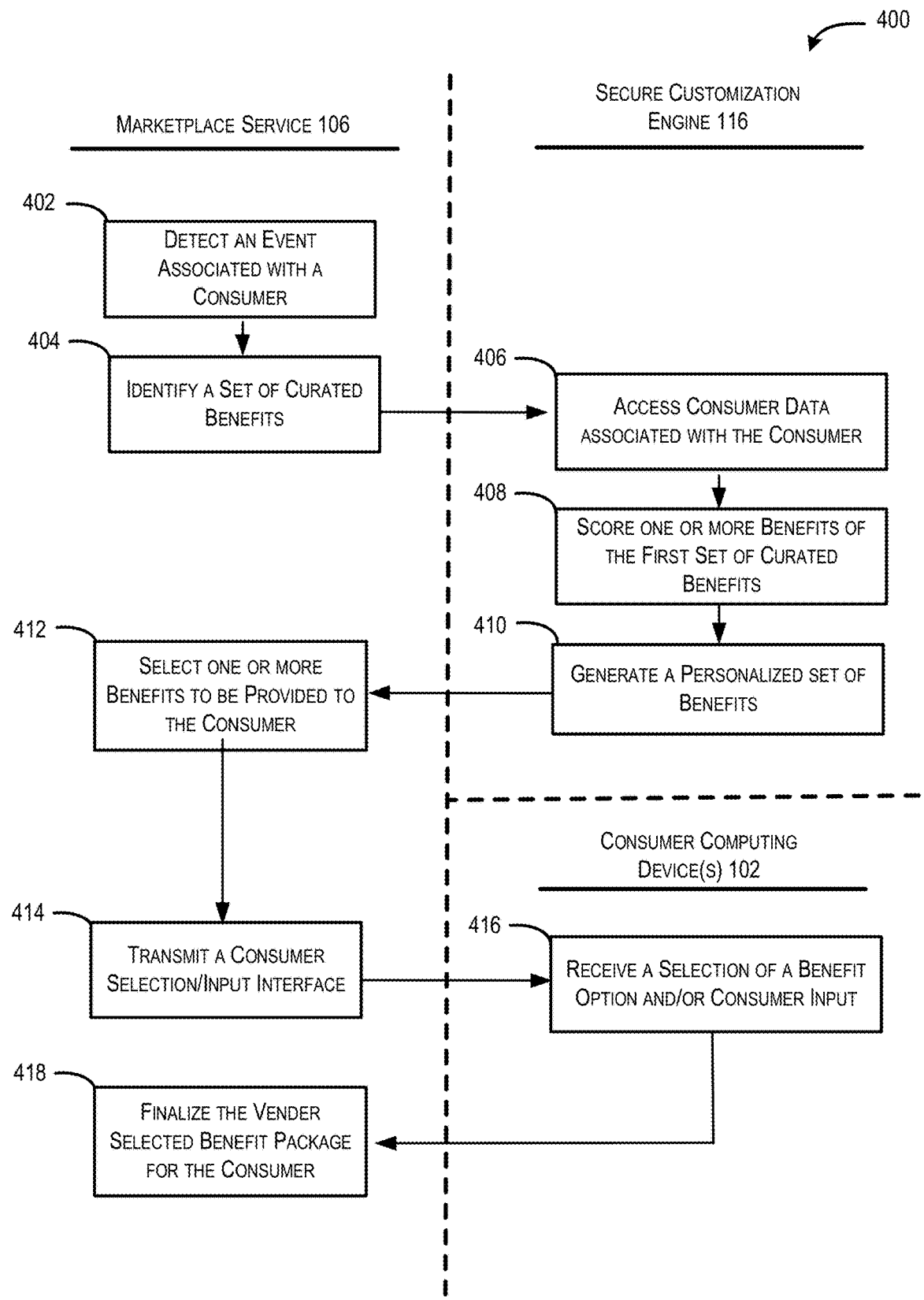
FIG. 4 is a flow diagram of illustrative process for utilizing consumer interactions to generate customized selected benefits while protecting consumer information.

FIGS. 3 and 4 are flow diagrams of illustrative processes illustrated as a collection of blocks in a logical flow graph, which represent a sequence of operations that can be implemented in hardware, software, or a combination thereof. The blocks are organized under entities and/or devices that may implement operations described in the blocks. However, other entities/devices may implement some blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 for identifying customized selected benefits while protecting consumer information. The process 300 may be implemented by the computing architecture 200 and in the environment 100 described above, or in other environments and architectures.

At 302, marketplace service 106 detects an event associated with a consumer. An event may correspond to an indicator that a consumer has purchased a selected benefit package. Alternatively, an event may correspond to an indicator of an occurrence of a pre-scheduled interval (e.g., one a day, twice a month, biannually, etc.) at which a selected benefit package should be sent to a consumer. For example, where a consumer has purchased a membership in a monthly benefit package, the marketplace service 106 will detect a corresponding event each month, and will trigger the process of building a new benefit package for the consumer.

At 304, marketplace service 106 identifies a set of curated benefits. In some embodiments, marketplace service 106 may determine the curated set of benefits based on catalogue data, one or more benefit rules, and/or one or more curated lists. The catalogue data may identify benefits offered by the marketplace service 106, and/or other marketplace platforms. For example, the catalogue data may include benefits that are offered, information about the benefits (e.g., descriptions, prices, current sales, etc.), availability of the benefits (e.g., amount in stock, seasonal availability, etc.), and as well as other benefit related information.

The benefit rules may include sets of one or more rules for generating corresponding curated set of benefits. For example, for a family game night benefit package, corresponding benefit rules may specify that qualifying games must be for children 12 years old or older, that games included in the benefit package should be for 4 or more players, and that the benefit package is to not include puzzles. In this way, when marketplace service 106 detects an event associated with the family game night benefit package, it may generate a curated list of potential games that may be provided to the consumer based on the corresponding benefit rules. The curated lists may include one or more itemized lists of benefits that have been previously selected for potential inclusion in benefit packages. The curated lists may be input into the marketplace service 106 by a curator, may be generated automatically by the marketplace system, or a combination thereof.

At 306, marketplace service 106 transmits the set of curated benefits and a consumer identifier to secure customization engine 116. For example, the marketplace service 106 may submit the set of curated benefits and the consumer identifier via an API (application programing interface). In some embodiments, the marketplace service 106 may also transmit an order identifier associated with the event. The consumer identifier may correspond to a consumer ID, consumer account identifier, or other piece of data that expresses the identity of the consumer.

At 308, secure customization engine 116 accesses consumer data associated with the consumer. For example, secure customization engine 116 may be able to securely access customer information (e.g., behavior information, profile information, past purchase information, demographic information, geographic information, stated and/or determined consumer preferences, etc.). In this way, the secure customization engine 116 may use the consumer identifier to securely access consumer information associated with the consumer that is receiving the benefit package, and may determine the personalized set of benefits based on the consumer information and the curated set of benefits.

At 310, secure customization engine 116 scored one or more benefits of the first set of curated benefits. For example, secure customization engine 116 may determine a predicted interest value for individual benefits based on the consumer information, and assign scores and/or rank individual benefits according to the predicted level of interest in the benefit. In some embodiments, secure customization engine 116 may assign a weight to the scores previously assigned to the curated set of benefits assigned by the marketplace service 106 based on the predicted level of interest in the benefit. Alternatively or in addition, secure customization engine 116 may generate a personalized ranking of benefits in the curated set of benefits based on the predicted level of interest of the consumer in the individual benefits.

At 312, secure customization engine 116 generates a personalized set of benefits. For example, secure customization engine 116 may select individual benefits based on corresponding score(s), and/or a ranking of the personalized set of benefits. In some embodiments, secure customization engine 116 may select a present number of benefits for inclusion in the benefits package. Alternatively or in addition, secure customization engine 116 may remove benefits that the consumer information indicates have already been provided to the consumer.

At 314, secure customization engine 116 transmits the personalized set of benefits to the marketplace service 106. For example, the secure customization engine 116 may submit the personalized set of benefits to the marketplace service 106 via an API. In some embodiments, secure customization engine 116 may transmit the personalized set of benefits in association with the order identifier.

At 316, marketplace service 106 selects one or more benefits to be provided to the consumer. For example, marketplace service 106 may select individual benefits based on corresponding score(s), and/or a ranking of the personalized set of benefits. In some embodiments, marketplace service 106 may select the benefits to include in the benefits package based on one or more of a present number of benefits, a total price of the benefits in the benefits package, a size of the container within which the benefits package is being shipped, a diversity of types of benefits within the benefit, a required set of benefit categories, etc.

FIG. 4 is a flow diagram of an illustrative process 400 for utilizing consumer interactions to generate customized selected benefits while protecting consumer information. The process 400 may be implemented by the computing architecture 200 and in the environment 100 described above, or in other environments and architectures.

At 402, marketplace service 106 detects an event associated with a consumer. An event may correspond to an indicator that a consumer has purchased a selected benefit package. Alternatively, an event may correspond to an indicator of an occurrence of a pre-scheduled interval (e.g., one a day, twice a month, biannually, etc.) at which a selected benefit package should be sent to a consumer.

At 404, marketplace service 106 identifies a set of curated benefits. In some embodiments, marketplace service 106 may determine the curated set of benefits based on catalogue data, one or more benefit rules, and/or one or more curated lists. The catalogue data may identify benefits offered by the marketplace service 106, and/or other marketplace platforms. The benefit rules may include sets of one or more rules for generating corresponding curated set of benefits. The curated lists may include one or more itemized lists of benefits that have been previously selected for potential inclusion in benefit packages. The curated lists may be input into the marketplace service 106 by a curator, may be generated automatically by the marketplace system, or a combination thereof.

At 406, secure customization engine 116 accesses consumer data associated with the consumer. For example, secure customization engine 116 may use a consumer identifier to securely access customer information (e.g., behavior information, profile information, past purchase information, demographic information, geographic information, stated and/or determined consumer preferences, etc.

At 408, secure customization engine 116 scored one or more benefits of the first set of curated benefits. For example, secure customization engine 116 may determine a predicted interest value for individual benefits based on the consumer information, and assign scores and/or rank individual benefits according to the predicted level of interest in the benefit. In some embodiments, secure customization engine 116 may assign a weight to the scores previously assigned to the curated set of benefits assigned by the marketplace service 106 based on the predicted level of interest in the benefit. Alternatively or in addition, secure customization engine 116 may generate a personalized ranking of benefits in the curated set of benefits based on the predicted level of interest of the consumer in the individual benefits.

At 410, secure customization engine 116 generates a personalized set of benefits. For example, secure customization engine 116 may select individual benefits based on corresponding score(s), and/or a ranking of the personalized set of benefits. In some embodiments, secure customization engine 116 may select a present number of benefits for inclusion in the benefits package. Alternatively or in addition, secure customization engine 116 may remove benefits that the consumer information indicates have already been provided to the consumer.

At 412, marketplace service 106 selects one or more benefits to be provided to the consumer. For example, marketplace service 106 may select individual benefits based on corresponding score(s), and/or a ranking of the personalized set of benefits. In some embodiments, marketplace service 106 may select the benefits to include in the benefits package based on one or more of a present number of benefits, a total price of the benefits in the benefits package, a size of the container within which the benefits package is being shipped, a diversity of types of benefits within the benefit, a required set of benefit categories, etc.

At 414, marketplace service 106 transmits a consumer selection/input interface to a consumer computing device associated with the consumer. For example, the interface may provide the consumer with the ability to select between two or more similar benefits that have been highly scored. Alternatively or in addition, the interface may indicate the benefits that have been selected for inclusion in the curated benefit package, and may provide functionality to add or replace individual benefits. For example, in response to consumer input to remove a particular benefit, the interface may provide one or more alternative benefits from the personalized set of benefits. In some embodiments, the alternative benefits may be provided based on an associated score, weight, ranking, or a combination thereof.

At 416, consumer computing device 102 receives a selection of a benefit option and/or consumer input. For example, consumer computing device 102 may receive a input corresponding to the selection of an individual benefit of two or more potential benefits. The consumer computing device 102 may also receive consumer input corresponding to a new rule. For example, the consumer may indicate that none of the benefits included in the package should cost more than $15.

At 418, marketplace service 106 finalizes the selected benefit package for the consumer. For example, marketplace service 106 may generate an order document for the consumer benefit package that identifies the benefits that are to be provided in the benefit package, prices to be charged for individual benefits, providers that are to provide individual benefits, consumer billing information, a shipping address, etc. The marketplace service may then provide the order document to one or more fulfillment centers for aggregation of benefits, packing of the benefits package, and shipment. Alternatively, marketplace service 106 may store the order document in a secure memory location that is accessible by the one or more fulfillment centers using an order identification number.

Figure 5B:
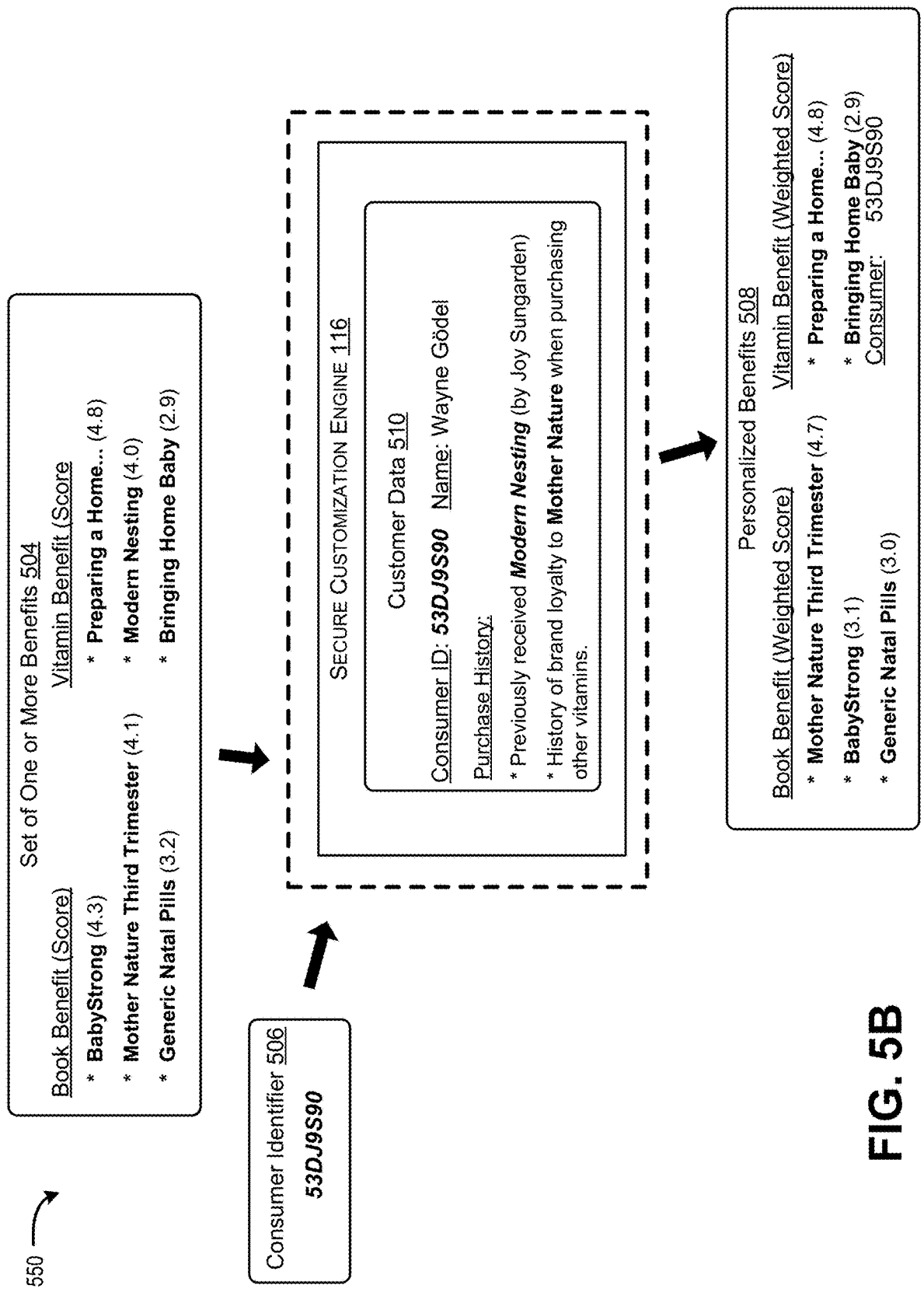
FIGS. 5A and 5B are example illustrations of processes for generating customized selected benefits to consumers while protecting consumer information.
Figure 2:
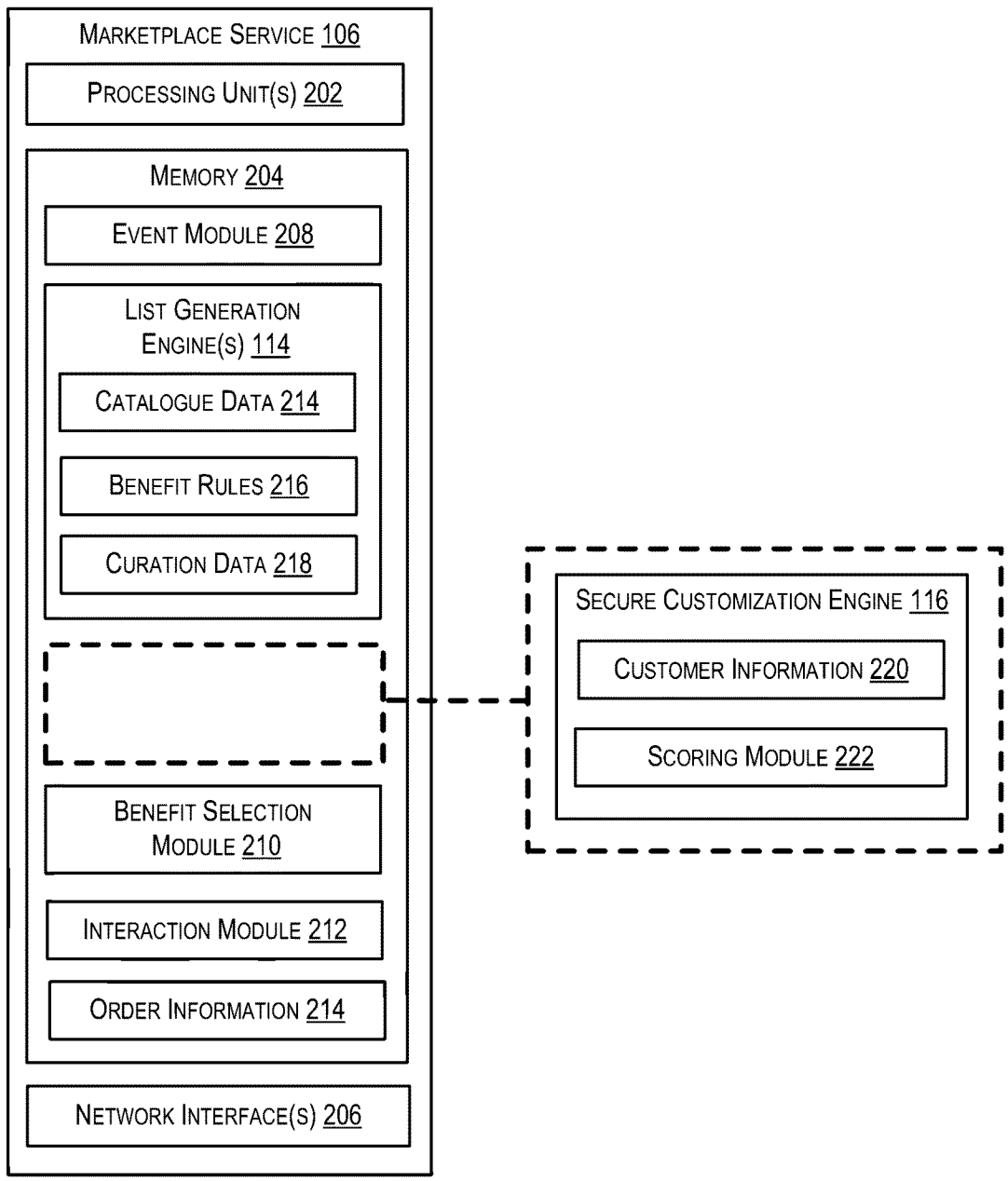
Figure 3:
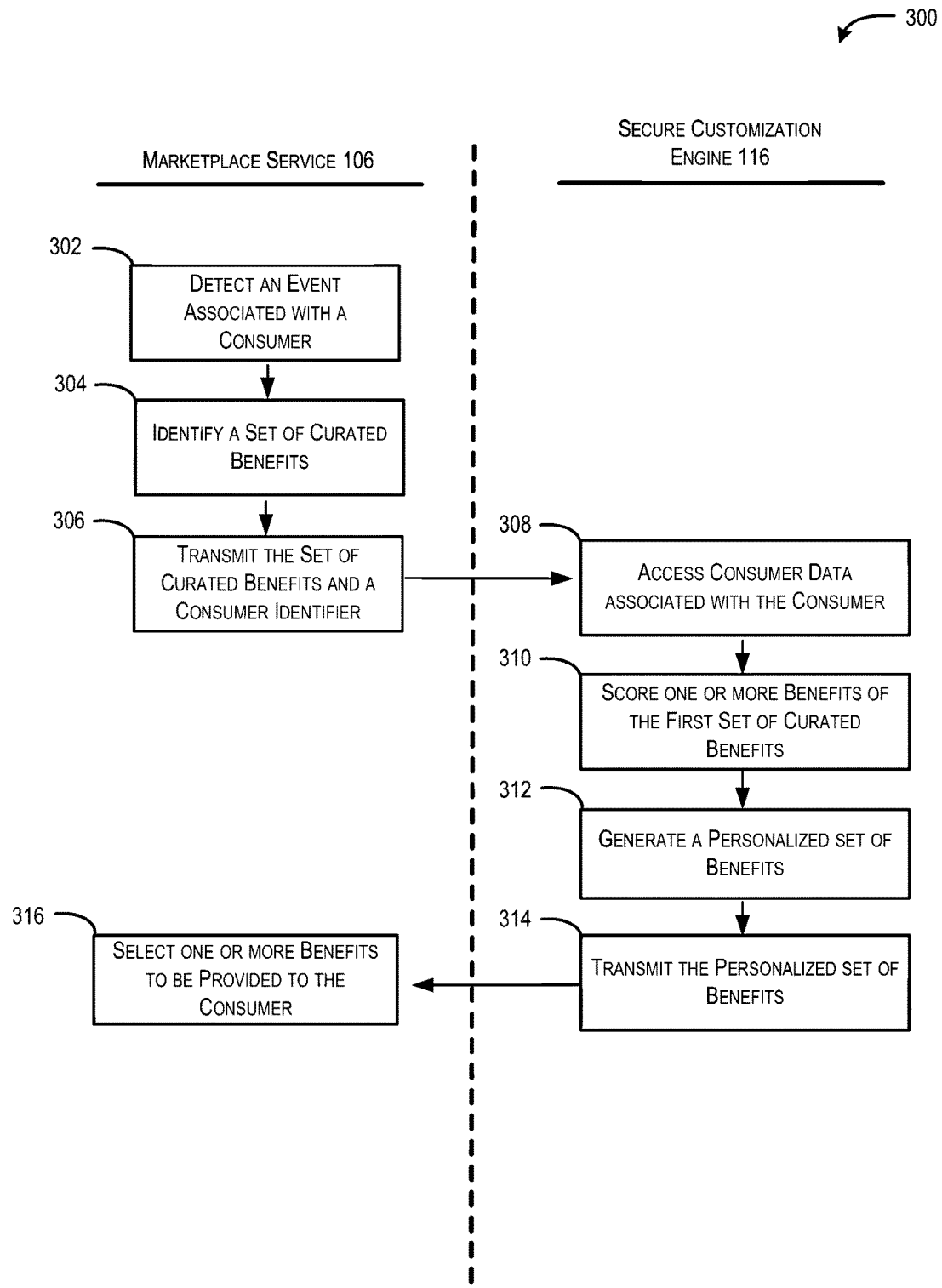
Figure 4:
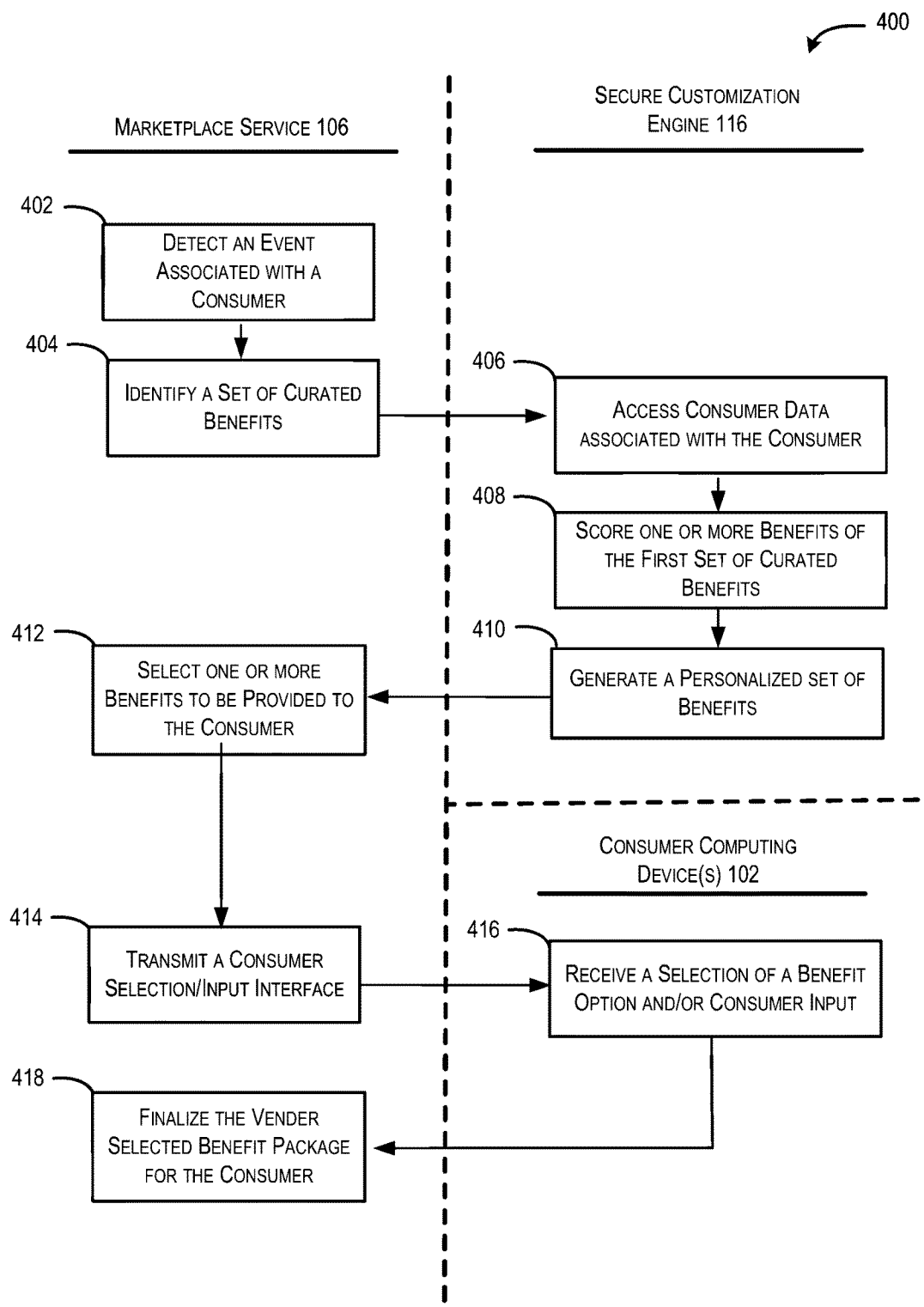
Figure 5A:
Figure 5B:
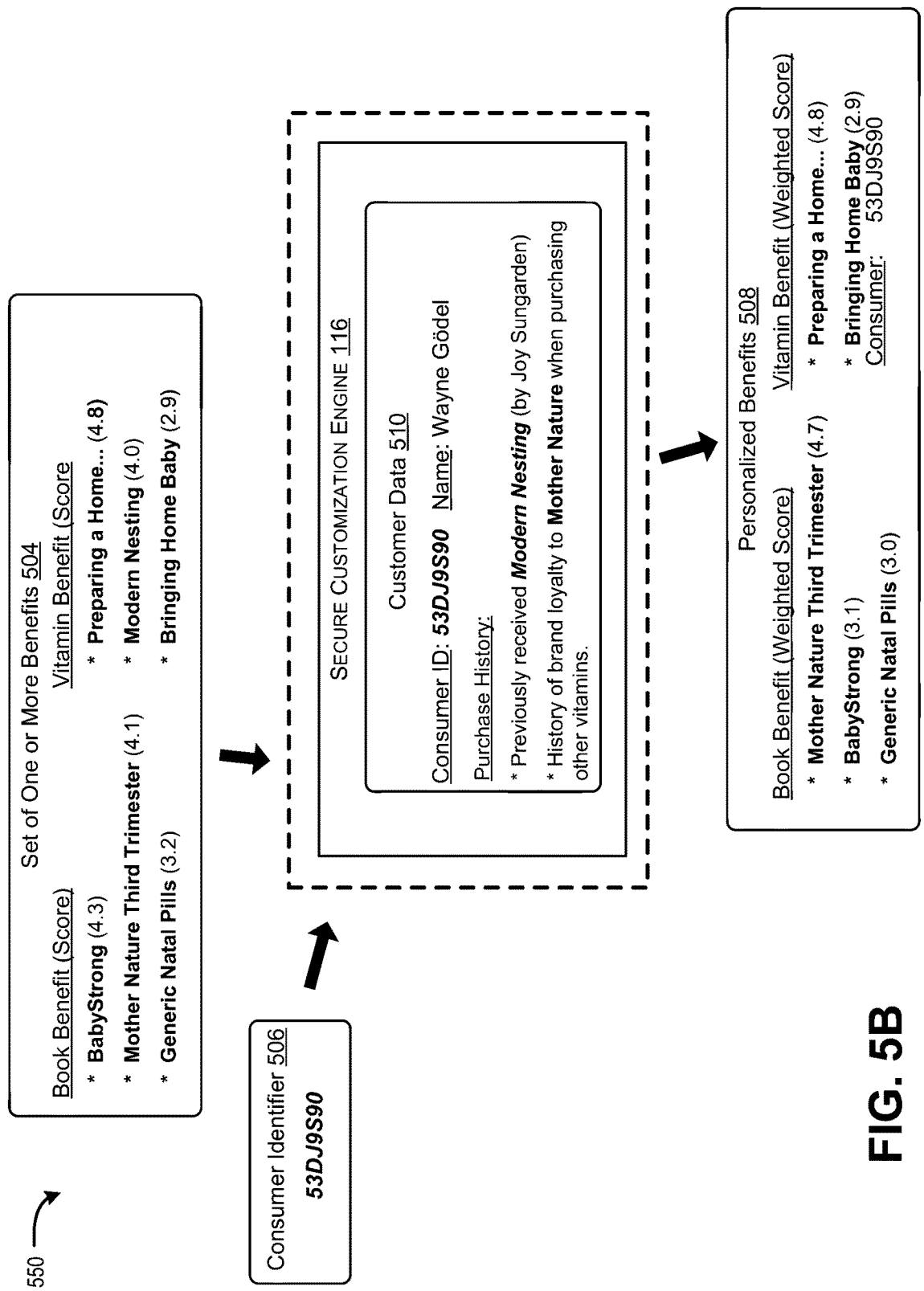

FIGS. 5A and 5B are example illustrations 500 and 550 of methods for generating customized selected benefits to consumers while protecting consumer information. FIG. 5A illustrates the process 500 of generating a set of one or more benefits for a selected benefit package. FIG. 5A depicts an event 502 that indicates that a selected benefit package is to be generated for month 7 out of 9 of a pregnancy benefit package. Event 502 further indicates a consumer identifier associated with the consumer that is to receive the benefit package.

FIG. 5A further depicts a set of one or more benefits 504 that is generated by list generation engine 114 for potential inclusion in the selected benefit package is to be generated for month 7 out of 9 of a pregnancy benefit package. In some embodiments, individual benefits of the set of one or more benefits 504 may be scored by the list generation engine 114. FIG. 5A further shows sample catalogue data 214, benefit rules 216, and a curation data 218 that may be used by the list generation engine to generate the a set of one or more benefits 504 and/or score the individual benefits. For example, set of one or more benefits 504 does not include the newborn guidebook "Dr. Bob's Third Trimester Guide" because catalogue data 214 indicates that the book is not in stock. Additionally, set of one or more benefits 504 depicts a relatively lower score for "Generic Natal Pills" because benefit rules 216 indicate that the consumer requested that brand name vitamins be preferred to generic vitamins.

FIG. 5B illustrates the process 550 of generating a set of personalized benefits for a selected benefit package using a secure customization engine. FIG. 5B depicts set of one or more benefits 504 and consumer identifier 506 being provided to secure customization engine 116. The set of one or more benefits 504 and consumer identifier 506 may be passed to the secure customization engine 116 via an API exposed by the secure customization engine.

FIG. 5B further depicts a set of personalized benefits 508 that has been customized by the secure customization engine 116. FIG. 5B also depicts customer data 510 that may be used by the secure customization engine 116 to generate the personalized benefits 508. For example, the book "Modern Nesting" is not included in the personalized benefits 508 because customer data 510 indicates that the consumer has already received this book. FIG. 5B depicts secure customization engine 116 acting as a black box module that returns personalized benefits 508 without exposing customer data to the list generation engine 114 or other elements of the marketplace service. In this way, the marketplace service is able to receive the personalized benefits without requiring permissions to access secure data. Additionally, this allows list generation engine 114 to be created without requiring an acquisition of consumer data 510, or that the list generation engine 114 having to include security protocols to safeguard such consumer data 510.

In some embodiments, individual benefits of the personalized benefits 508 may be scored by the secure customization engine 116 using the customer data 510. Alternatively, where the set of one or more benefits 504 includes scores for the individual benefits, the secure customization engine 116 may determine a weighted score that takes into account customer data 510. For example, personalized benefits 508 shows a high weighted score because customer data 510 shows that the consumer's past behavior has indicated a preference for the vitamin brand Mother Nature.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computing system for providing service selected benefits comprising:
one or more processing units; and
memory storing computer-executable instructions executable by the one or more processors to perform operations comprising;
detecting an event associated with an acquisition of a benefit package;
determining, by a list generation engine and in response to the event, at least a first benefit and a second benefit selected for inclusion as part of the benefit package;
providing, by the list generation engine, the first benefit, the second benefit, and a recipient identifier corresponding to a recipient associated with the benefit package to a secure customization engine configured to access secure recipient transaction history associated with the recipient identifier;
receiving, from the secure customization engine and based at least in part on the secure recipient transaction history, a first score corresponding to a first predicted level of interest in the first benefit and a second score corresponding to a second predicted level of interest in the second benefit; and
selecting, without access to the secure recipient transaction history, the first benefit for inclusion in the benefit package based at least in part on the first score and the second score.

2. The computing system as recited in claim 1, wherein the benefit package is associated with a benefit program, and determining the first benefit and the second benefit comprises:
accessing a curation data associated with the benefit program, the curation data specifying one or more sets of benefits available to be provided at different times; and
selecting the first benefit and the second benefit based at least in part on the curation data.

3. The computing system as recited in claim 1, wherein the benefit package is associated with a benefit program, and determining the first benefit and the second benefit comprises:
accessing curation data associated with the benefit program, the curation data specifying one or more rules for identifying benefits for the benefit package;
accessing catalogue data associated with a marketplace service, the catalogue data identifying benefits offered by the marketplace service; and
selecting the first benefit and the second benefit based at least in part on the curation data and the catalogue data.

4. The computing system as recited in claim 1, wherein the benefit package is associated with a benefit program, and the operations further comprise selecting, the list generation engine from a set of two or more list generation engines based at least in part on the benefit program.

5. A computer-implemented method comprising:
detecting an event associated with a benefit package;
determining, based at least in part on the event, a first benefit associated with the benefit package and a second benefit associated with the benefit package;
providing at least the first benefit, the second benefit, and a recipient identifier associated with the event to a secure customization engine, wherein the secure customization engine is able to access secure recipient data associated with the recipient;
receiving, from the secure customization engine and based at least in part on the secure recipient data, a first predicted level of interest in the first benefit and a second predicted level of interest in the second benefit; and
selecting the first benefit for inclusion in the benefit package based at least in part on the first predicted level of interest and the second predicted level of interest.

6. The computer-implemented method of claim 5, wherein the event is associated with a benefit program where benefit packages are provided to the recipient at set intervals.

7. The computer-implemented method of claim 6, wherein determining the first benefit and the second benefit comprises:
accessing a curation data specifying one or more sets of benefits that may to be provided at corresponding intervals; and
selecting the first benefit and the second benefit based at least in part on the curation data.

8. The computer-implemented method of claim 6, the event is a first event, the benefit package is a first benefit package, and further comprising:
detecting a second event associated with a second package for the benefit program;
determining, based at least in part on the second event, a third benefit associated with the benefit program and a fourth benefit associated with the benefit program;
providing the third benefit, the fourth benefit, and the recipient identifier associated with the event to the secure customization engine;
receiving, from the secure customization engine and based at least in part on the secure recipient data, a third predicted level of interest in the third benefit and a fourth predicted level of interest in the fourth benefit;
selecting the third benefit for inclusion in the second benefit package based at least in part on the third predicted level of interest and the fourth predicted level of interest.

9. The computer-implemented method of claim 5, wherein determining the first benefit and the second benefit comprises:
accessing curation data specifying one or more rules for identifying benefits for the benefit package;
accessing catalogue data identifying benefits offered by a marketplace service; and
selecting the first benefit based at east in part on the curation data and the catalogue data.

10. The computer-implemented method of claim 9, further comprising:
receiving, from a recipient device associated with recipient, a request to obtain the benefit package;
receiving, from the recipient device, the one or more rules for identifying benefits for the benefit package.

11. The computer-implemented method of claim 9, wherein the marketplace service is a first marketplace service, and determining the first benefit and the second benefit further comprises:
accessing second catalogue data identifying benefits offered by a second marketplace service; and
selecting the second benefit based at least in part on the curation data and the second catalogue data.

12. The computer-implemented method of claim 5, wherein the benefit package includes at least one of a physical item, a certificate for a service, or a certificate for a digital item, and the method further comprising selecting a list generation engine from a set of two or more list generation engines based at least in part on the benefit package.

13. The computer-implemented method of claim 5, further comprising:
- transmitting, to a recipient device associated with recipient, an option to select between the first benefit and a third benefit;
- receiving from the recipient device, a selection of the first benefit; and
- wherein selecting the first benefit for inclusion in the benefit package further based at least in part on the selection.

\* \* \* \* \*

UNITED STATES PATENT AND TRADEMARK OFFICE
CERTIFICATE OF CORRECTION

PATENT NO. : 10,692,123 B1
APPLICATION NO. : 15/595584
DATED : June 23, 2020
INVENTOR(S) : Lin et al.

It is certified that error appears in the above-identified patent and that said Letters Patent is hereby corrected as shown below:

Please delete patent 10,692,123 B1 in its entirety and insert patent 10,692,123 B1 in its entirety.

Signed and Sealed this
Twentieth Day of October, 2020

Andrei Iancu
*Director of the United States Patent and Trademark Office*

(12) United States Patent
Lin et al.

(10) Patent No.: US 10,692,123 B1
(45) Date of Patent: Jun. 23, 2020

(54) SECURE CUSTOMIZATION AND ASSEMBLAGE SYSTEM FOR MULTI-PLATFORM PACKAGES

(71) Applicant: Amazon Technologies, Inc., Seattle, WA (US)

(72) Inventors: Jennifer Marie Lin, Seattle, WA (US); Adam Russell Bains, Seattle, WA (US); Pawan Chopra, Seattle, WA (US); Steven Duchscherer, Seattle, WA (US); Karan Narang, Seattle, WA (US); Madeleine North, Seattle, WA (US); Iliana C. Sach, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 436 days.

(21) Appl. No.: 15/595,584

(22) Filed: May 15, 2017

(51) Int. Cl.
  *G06Q 30/00* (2012.01)
  *G06Q 30/06* (2012.01)
(52) U.S. Cl.
  CPC ..... *G06Q 30/0621* (2013.01); *G06Q 30/0607* (2013.01); *G06Q 30/0627* (2013.01); *G06Q 30/0631* (2013.01)

(58) Field of Classification Search
  CPC .................... G06Q 30/06–08
  USPC .................. 705/26.1–27.2
  See application file for complete search history.

(56) References Cited

U.S. PATENT DOCUMENTS 10,275,819 B1 * 4/2019 Johnson ............. G06N 7/005

* cited by examiner

*Primary Examiner* — Ethan D Civan
(74) *Attorney, Agent, or Firm* — Lee & Hayes, P.C.

(57) ABSTRACT

An event driven computing system generates selected benefit packages that include benefits that are drawn from multiple marketplace platforms and diverse product categories while also protecting consumer information. The event driven computing system may include one or more list generation engines that are each built to generate curated lists of benefits associated with one or more corresponding benefit package programs. The event driven system may then pass the curated lists and an identifier associated with a recipient of the benefit package to a secure customization engine that personalizes the curated sets of benefits to individual consumers based on consumer data. The event driven system can then use the personalized sets of benefits to select benefits for inclusion in the benefit package that are individually tailored to the recipient.

20 Claims, 6 Drawing Sheets

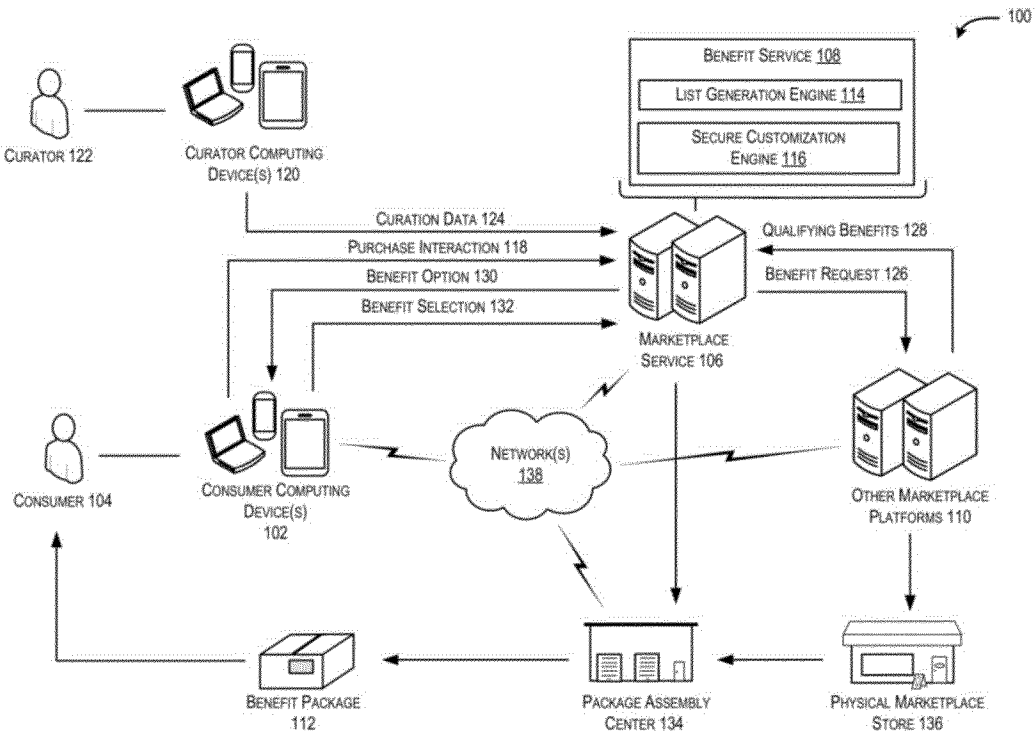

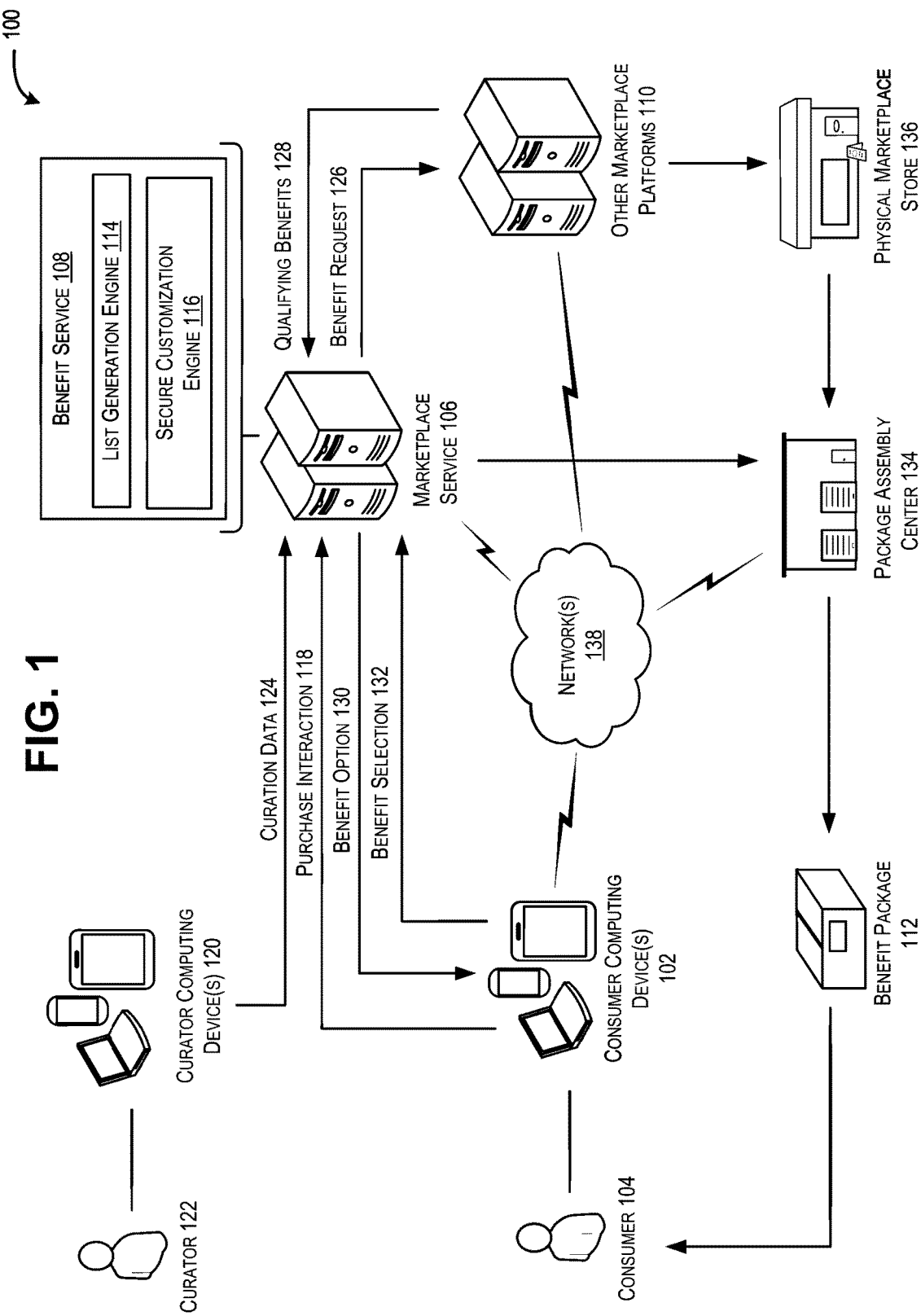

SECURE CUSTOMIZATION AND ASSEMBLAGE SYSTEM FOR MULTI-PLATFORM PACKAGES

BACKGROUND

Most marketplace transactions involve consumers selecting specific goods or services to purchase from a vendor. However, some consumers desire transactions where the vendor selects the particular goods or services that are to be provided on behalf of the consumer. Currently, most systems that enable consumers to purchase vendor selected goods or services use human curation to identify the collection of goods or services that are to be provided to the consumers. However, providing human curated goods or services that are specifically tailored to individual users is difficult to implement and manage on a large scale.

Additionally, while some current systems use algorithms to select goods or services for consumers, because of security constraints associated with protecting customer information, these systems are narrowly tailored to only select goods or services from a specific subset of goods or services (i.e., items of clothing, books, bottles of wine, etc.) and from a single marketplace platform. That is, to prevent consumer information from being exposed, current algorithmic systems are tightly designed to provide customized selections from a predetermined catalogue of goods or services provided by a marketplace platform.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 is an illustrative environment for providing customized selected benefits to consumers while protecting consumer information.

FIG. 2 is an illustrative computing architecture of the marketplace service shown in FIG. 1.

FIG. 3 is a flow diagram of an illustrative process for identifying customized selected benefits while protecting consumer information.

FIG. 4 is a flow diagram of illustrative process for utilizing consumer interactions to generate customized selected benefits while protecting consumer information.

FIGS. 5A and 5B are example illustrations of processes for generating customized selected benefits to consumers while protecting consumer information.

DETAILED DESCRIPTION

This disclosure is generally directed to an event driven computing system for providing selected benefits. A benefit may include a physical good, a service, a digital good, a digital asset (e.g., access to a digital service), a reservation, a membership, a promotion, coupon, credit, or other consumable item or service. A benefit package may include a collection of one or more benefits that are provided to the consumer. The event driven computing system is capable of generating selected benefit packages that include benefits that are drawn from multiple marketplace platforms and diverse product categories while also protecting consumer information. For example, the benefits in a benefit package may be sourced from more than one marketplace platform (e.g., an online marketplace, a digital service platform, a physical merchant, a restaurant booking platform, etc.). In some embodiments, the curated set of benefits may be associated with a particular benefit package program. For example, for a STEM (Science Technology Engineering and Math) toy of the month club, the curated set of benefits may correspond to a set of STEM themed toys that have been chosen for the current month.

The event driven computing system may include a list generation engine for generating curated lists of benefits associated with one or more benefit package programs, and a secure customization engine that personalizes the curated sets of benefits to individual consumers based on consumer data. Upon detection of an event associated with a consumer, list generation engine may identify a curated list of benefits that may be provided to the consumer. An event may include an indicator that a consumer has purchased a selected benefit package, or an indicator that a pre-scheduled interval (e.g., one a day, twice a month, biannually, etc.) has occurred. An event may also include an indicator of an occurrence, such as a holiday, a consumer's birthday, a wedding, and anniversary, etc. For example, where a consumer has purchased a membership in a weekly benefit package program, at a set time each week the system may detect an event indicating that a new benefit package is to be provided to the consumer.

In some embodiments, identifying the curated list of benefits may correspond to the list generation engine accessing curated lists that have been input into the computing system via a curator, automatically generating curated lists, or a combination thereof. In some embodiments, the computing system may store benefit program data that identifies one or more rules for generating a curated list of benefits for the benefit program. For example, for a Portland soccer themed benefit program, the benefit program data may identify one or more rules such as (i) price of the benefit must be under $25, (ii) benefits produced in the pacific northwest are preferred, (iii) the benefit must be associated with a Portland college or professional soccer team, (iv) the benefits are to be provided by a combination of: amazon.com, etsy.com, mls.com, addidas.com, and ebay.com. Then, when the computing system detects an event associated with the Portland soccer themed membership, the benefit program generates a curated list of benefits based on the rules identified in the benefit program data. In some embodiments, the rules may be input by a benefit program manager for the particular benefit program. Alternatively, the rules may be input by a consumer during a purchase associated with the benefit program.

In some embodiments, the curated list of benefits may be generated based on curation data that identifies a schedule of benefits that may be provided to consumers from time to time, such as randomly, periodically at set intervals, etc. The schedule specified by the curation data may identify time periods during which particular benefits are to be provided (i.e., for the first three months after signing up, in the month of January, etc.). Alternatively or in addition, the schedule may be accomplishment driven, which may be determined using a feedback loop (i.e., the consumer has demonstrated mastery of a skill, academic progress, reading level, completion of a task, etc.). For example, the computing system may store curation data for a parenting benefit program that identifies a schedule that specifies set times during child development (e.g., prenatal vitamins during pregnancy, maternity clothes during the three months before a child's due date, infant formula appropriate for a 3-6 month old, etc.) that particular benefits are to be provided to the consumer.

The computing system then provides curated list of benefits and a consumer identifier to the secure customization engine, which determines a personalized set of benefits that are tailored to the consumer. The secure customization engine may use the consumer identifier to access consumer information (e.g., behavior information, profile information, past purchase information, demographic information, geographic information, stated and/or determined consumer preferences, etc.) associated with the consumer that is receiving the benefit package. In some embodiments, the actions of the secure customization engine may be independent of the list generation engine and/or benefit package program that is associated with the curated list of benefits. The secure customization engine may determine the personalized set of benefits based on the consumer information and the curated set of benefits.

For example, the secure customization engine may remove benefits that have previously been purchased by the consumer. The secure customization engine may also determine a predicted consumer interest in individual benefits based on the consumer information, and assign scores to individual benefits that correspond to the predicted level of interest in the benefit. Alternatively, where the set of benefits is already associated a ranking, the customization engine may generate a personalized ranking for the consumer that is based on the predicted level of interest of the consumer in the individual benefits.

The computing system then selects from the personalized set of benefits, one or more benefits that are to be provided to the consumer in the benefits package. The computing system may select individual benefits based on a corresponding score, and/or a ranking of the one or more benefits. The computing system may select a present number of benefits for inclusion. Alternatively or in addition, the computing system may select the one or more benefits based on a number of other factors, such as total price of the benefits in the benefits package (i.e., less than a preset value, within a value range, etc.), a size of the container within which the benefits package is being shipped, a diversity of types of benefits within the benefit package (e.g., at least one physical item and one digital item), a required set of benefit categories, etc. For example, for new parents benefit package program, at three months from consumer's due date, the computing system may select the highest scored baby formula, the highest scored baby toy, and the two highest scored items of 3-6 month old baby clothes. In another example, for a date night package subscription, the computing system may select combination of a highly scored wine, a dessert, and the digital rights to watch a recommended movie, based at least in part on the benefits having a total value between $30 and $35. In some embodiments, the computing system may provide the consumer with an ability to select between two or more highly scored benefits, so that the consumer is able to choose the specific benefit that is to be included in the benefits package.

The computing system then generates one or more order documents for the selected one or more benefits. The computing system may transmit the order documents to individual merchants that are providing one or more goods to be included in the benefits package. Alternatively, the computing system may transmit an order identifier to the individual merchants that are providing one or more goods, and store the order documents in a location that is accessible to the individual merchants using the order identifier.

After the benefits package is sent to the consumer, the computing system may receive interaction information from a computing device associated with the consumer, with the benefits package, or both. For example, the computing device may receive an indication that the consumer has accessed a digital benefit via an application associated with the computing device. Alternatively or in addition, the benefits package may include a visual or alphanumeric code that can be scanned or entered before an account associated with the consumer is allowed to access a digital benefit. For example, a benefits package for a date-night subscription may include a printed quick response (QR) code that, when scanned by an application, allows an account associated with the consumer to watch a new release movie without being charged. In some embodiments, the digital benefit that is associated with the visual or alphanumeric code may not be determined until after the code is scanned or entered. For example, entering or scanning the code may cause the computing system to cause a computing device associated with the consumer to present a functionality to choose between two or more digital benefits that the consumer is to receive. Alternatively or in addition, in response to an entering or scanning of the code, the computing system may cause the secure customization engine to make a determination of one or more highly scored digital benefits for the consumer based on consumer information available at the time the code is entered or scanned. For example, if between the time of shipment of the benefits package and the time the consumer enters or scans the code the consumer has finished watching the television series "Firefly," the secure customization engine may cause a benefit of accessing the digital movie "Serenity" to be highly rated.

In some embodiments, the computing system may generate additional consumer information based on the interaction information. For example, if the consumer returns and/or never consumes a benefit, the computing system may cause the consumer preferences associated with the consumer to be adjusted accordingly. In another example, if interaction information indicates that a consumer who has purchased a subscription for learning to code has completed a task associated with a benefit package, such as an online lecture series on html programming, the computing system may cause a coding competency level associated with the consumer to be changed adjusted (e.g., from beginner to novice).

The techniques, apparatuses, and systems described herein may be implemented in a number of ways. Example implementations are provided below with reference to the following figures.

FIG. 1 is a schematic diagram of an illustrative environment 100 for providing customized selected benefits to consumers while protecting consumer information. The environment 100 includes the consumer computing device 102, and consumer 104 associated with consumer computing device 102. Consumer computing device 102 may include any type of device (e.g., a laptop computer, a tablet device, a mobile telephone, etc.), and which may include one or more processor(s), computer-readable media, and a display.

The environment 100 may also include marketplace service 106 that may host benefit service 108. Marketplace service 106 may be any entity, server(s), platform, etc., that offers items (e.g., products, services, etc.) for acquisition to consumers. For example, the marketplace service 106 may be associated with an electronic or merchant marketplace (e.g., a website, electronic application, widget, etc.) that allows consumers to search, browse, view and/or acquire (i.e., purchase, rent, lease, borrow, etc.) benefits offered for sale directly by the marketplace service 106 or offered for sale by the marketplace service 106 on behalf of other entities. The marketplace service 106 may also obtain/receive and maintain consumer information about actual or potential customers (e.g., consumers 106), etc., for the purpose of presenting the most relevant items, deals, recommendations, advertisements, etc.

The benefit service 108 may be a service that allows consumer 104 to purchase benefit package(s) 112 that include one or more benefits that are selected by the benefit service 108, and which are provided to the consumer via physical shipment, digital transfer, or a combination thereof. Benefit package 112 may be a physical package (e.g., box, letter, physical storage device, etc.), a digital package (e.g., email, text message, downloadable file, etc.), or a combination thereof. In some embodiments, the benefits in a benefit package may be obtained from more than one source (e.g., marketplace service 106, other market platforms 110, etc.). A benefit may include a physical good, a service, a digital good, a digital asset (e.g., access to a digital service), a reservation, a membership, a promotion, coupon, discount, etc. In some embodiments the benefit service 108 may offer memberships in benefit programs, where a benefit package having theme corresponding to the program is shipped to the consumer from time to time, such as at a particular cadence. For example, the benefit service 108 may offer a benefit program for young readers, where once a month (or at other times) members of the benefit program receive a new benefit package of benefits associated with learning to read (e.g., books, reading tools, games, videos, applications, etc.). After passage of some time, the members may receive another different benefit associated with learning to read.

The benefit service 108 may also include list generation engine 114 and secure customization engine 116. The list generation engine 114 may identify a curated set of benefits in response to the detection of an event associated with purchase interaction 118 corresponding to consumer 104. Purchase interaction 118 may correspond to consumer 104 having purchased and/or requested a vendor selected benefit package. The event may be associated with a onetime purchase/request by consumer 104, or a repeating purchase/request where benefits packages are to be provided at pre-scheduled intervals (e.g., once a day, twice a month, biannually, etc.). The event may also include an indicator of an non-purchase occurrence, such as a holiday, a consumer's birthday, a wedding, an anniversary, etc. For example, a consumer 104 may have requested that a benefit package 112 be provided to his spouse each year on their wedding anniversary. In some embodiments, the curated set of benefits may be associated with a particular membership program. For example, for a wine and cheese of the month club, the curated set of benefits may correspond to a set of seasonal cheeses and wines that can be provided to the consumer.

In some embodiments, the curated set of benefits may be determined by an input of one or more benefits that is received by the marketplace service. For example, the marketplace service 106 may receive a curation data 124 from a curator computing device 120 associated with a curator 122. The curation data 124 may include one or more of a curated list that identifies one or more benefits that are to be included in a curated set of benefits, one or more rules for generating the curated set of benefits. Alternatively or in addition, the set of benefits may be generated automatically by the list generation engine 114. For example, benefit service 108 may store membership data that identifies one or more rules for generating the curated set of benefits for the corresponding membership. For example, for a farmers market themed membership, the membership data may identify a first rule that the benefit must be an organic produce item produced within a threshold distance of a location associated with the consumer, and a second rule that the produce items that are in season for shorter periods are to be preferred over produce items that are in season for longer periods. In this way, when the benefit service 108 detects an event associated with the farmers market membership, the list generation engine 114 may generate a curated list of produce items to potentially provide to the consumer based on the rules identified in the membership data. In some embodiments, the rules may be input by a curator 122 for a corresponding membership via curation data 124. Alternatively, the rules may be input by consumer 104 during a purchase of a membership or individual benefit package 112.

In some embodiments, the curation data 124 may include a schedule that identifies benefits that may be provided to consumers at set intervals. The intervals may correspond to a benefit package progression (e.g., one or more benefits that may be included in a first package, second package, etc.), a benefit progression (e.g., a first benefit should only be provided when a second benefit has previously been provided), time periods at which particular benefits are to be provided (e.g., one or more benefits that may be provided in the first year of membership, in the month of January), or may be accomplishment driven (e.g., the consumer has transitioned from first grade to second grade, completed a video/game/course/task/project, etc.), or a combination thereof. For example, marketplace service 106 may store benefit schedule data for a benefit package for expecting parents that identifies benefits that are to be provided to the consumer at set times during pregnancy (e.g., prenatal vitamins required at different stages of pregnancy, maternity clothes during the third trimester, instructional baby books, etc.).

When generating the curated set of benefits, the marketplace service may transmit a benefit request 126 to one or more other marketplace platforms 110 for one or more qualifying benefits 128 to include in the curated set of benefits. In some embodiments, the benefit request 126 may include one or more rules that identify parameters for selecting qualifying benefits 128. Alternatively or in addition, the benefit request 126 may include one or more of a membership ID that corresponds to a selected benefit membership, a benefit category identifier, or other identifier that the other marketplace platforms 110 can use to identify qualifying benefits. In some embodiments, the qualifying benefits 128 may be ranked and/or scored by the other marketplace platforms 110.

In some embodiments, the list generation engine 114 may also score and/or rank benefits in the curated set of benefits. For example, the list generation engine 114 may score the benefits based on availability (e.g., a low score for an item having inventory restrictions or limitations, a higher score for an item that marketplace service 106 has a large inventory of, etc.), merchant input (e.g., merchant requests that one or more particular items be included in the program), benefit ratings/reviews, marketplace performance (e.g., popular items scored higher), benefit history (i.e., time the benefit was introduced, monthly performance metrics for the benefit), etc. Alternatively or in addition, the benefits in a curated set of benefits may be scored or ranked by curator 122. In some embodiments, the list generation engine 114 may select a set number of benefits, select benefits having a ranking and/or score above a threshold value, or a combination thereof, to be included in the curated set of benefits.

The benefit service 108 may then provide the curated set of benefits and a consumer identifier to secure customization engine. The secure customization engine 116 may then determines a personalized set of benefits that are tailored to consumer 104. The secure customization engine 116 may be able to securely access customer information (e.g., behavior information, profile information, past purchase information, demographic information, geographic information, stated and/or determined consumer preferences, etc.) hosted by marketplace service 106 that is not accessible to the list generation engine 114. The secure customization engine 116 may use the consumer identifier to securely access consumer information associated with the consumer 104 that is receiving the benefit package 112, may determine the personalized set of benefits based on the consumer information and the curated set of benefits. For example, the secure customization engine 116 may remove benefits that the consumer information indicates have been previously acquired by the consumer.

In some embodiments, secure customization engine 116 may score or rank one or more benefits of the curated set of benefits. For example, secure customization engine 116 may determine a predicted interest value for individual benefits based on the consumer information, and may assign scores to individual benefits that correspond to the predicted level of interest in the benefit. In some embodiments, secure customization engine 116 may apply a weight to the scores assigned to the curated set of benefits assigned by the list generation engine 114 based on the predicted level of interest in the benefit. In this way, the weighted score may be based on both rules, market factors, curator inputs, and consumer information, while only exposing consumer information to a secure engine. Secure customization engine 116 may then generate a personalized ranking of benefits in the curated set of benefits based on the predicted level of interest of the consumer in the individual benefits.

The benefit service 108 then selects one or more benefits that are to be provided to consumer 104 in the benefits package 112. The benefit service 108 may select individual benefits based on its corresponding score(s), and/or a ranking of the one or more benefits. In some embodiments, benefit service 108 may select a present number of benefits for inclusion in the benefits package 112 that is indicated in membership data associated with the corresponding membership. Alternatively or in addition, benefit service 108 may select the one or more benefits based on a number of other factors, such as total price of the benefits in the benefits package (i.e., less than a preset value, within a value range, etc.), a size of the container within which the benefits package is being shipped, a diversity of types of benefits within the benefit package (e.g., at least one physical item and one digital item), a required set of benefit categories, etc. For example, for a membership program for learning to play guitar, an initial benefit package may include the highest scored guitar, the highest scored instructional booklet, the highest scored online learning resource, the highest scored set of guitar picks, and the highest scored guitar strings. In some embodiments, the marketplace service 106 may provide, via consumer device 102, the consumer 104 with a benefit option 130 ability to select between two or more similar benefits that have been highly scored. In this way, consumer 104 may provide a benefit selection 132 corresponding to a specific benefit that is to be included in the benefits package 112.

FIG. 1 also illustrates package assembly center 134 where customized benefit package 112 may be assembled and shipped to consumer 104. In some embodiments, package assembly center 134 may receive the benefits that are to be included in the benefit package 112 from one or more platforms associated with marketplace service 106, physical marketplace stores 136 associated with other marketplace platforms, benefit warehouses, etc. In some embodiments, the package assembly center 134 may provide a physical item in the benefit package 112 that corresponds to a digital benefit. For example, the benefits package 112 may include a visual or alphanumeric code that must be scanned or entered before an account associated with the consumer is allowed to access a digital benefit. In other embodiments, the package assembly center 134 may be a digital service provider that transmits digital benefits packages 112 to consumers. Additionally, in some embodiments the benefit package 112 may be provided by marketplace service 106, other marketplace platforms 110, physical marketplace stores 136, or a combination thereof.

FIG. 2 is an illustrative computing architecture 200 of a marketplace service that identifies customized selected benefits while protecting consumer information. The computing architecture 200 may be used to implement the various systems, devices, and techniques discussed herein. In various embodiments, marketplace service 106 can be implemented or hosted by one or more servers, server farms, data centers, or any of the other computing devices listed above.

In the illustrated implementation, the computing architecture 200 includes one or more processing units 202 coupled to a memory 204. The computing architecture may also include a network interface 206. The marketplace service 106 can include an event module 208, one or more list generation engines 114, a benefit selection module 210, and an interaction module 124 stored in the memory 204. FIG. 2 further illustrates secure customization engine 116 as being separate from marketplace service 106. However in some embodiments, the secure customization engine 116 may be incorporated as a component of the secure customization engine 116. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with marketplace service 106 can be executed across multiple devices.

The event module 208 can be executable by the one or more processing units 106 to detect an event associated with a consumer. An event may correspond to an indicator that a consumer has purchased a vendor selected benefit package. Alternatively, an event may correspond to an indicator of an occurrence of a pre-scheduled interval (e.g., one a day, twice a month, biannually, etc.) at which a selected benefit package should be sent to a consumer. For example, where a consumer has purchased a membership in a weekly benefit package, the event module 208 will detect a corresponding event at a set time each week, and will trigger the marketplace service 106 to initiate the process of building a new benefit package for the consumer.

The list generation engine(s) 114 may identify a curated set of benefits in response to a detection of an event by the event module 208. In some embodiments, the curated set of benefits may be associated with a particular membership program. For example, for a wine and cheese of the month club, the curated set of benefits may correspond to a set of seasonal cheeses and wines that can be provided to the consumer. Additionally, there may be more than one list generation engine 114 stored on the marketplace service 106, with different list generation engines 114 corresponding to different selected benefit memberships. For example, a first list generation engine that is configured to identify a curated set of benefits for a wine and cheese of the month club, and a second list generation engine that is configured to identify a curated set of benefits for a STEM themed selected learning package for children. The individual list generation engine 114 that is triggered to generate a curated set of benefits may be selected based on a type of event detected by the event module 208.

The list generation engine(s) 114 may have access to catalogue data 214, benefit rules 216, and curation data 218. The catalogue data 214 may identify benefits offered by the marketplace service 106, and/or other marketplace platforms. The catalogue data 214 may include benefits that are offered, information about the benefits (e.g., descriptions, prices, current sales, etc.), availability of the benefits (e.g., amount in stock, seasonal availability, etc.), and as well as other benefit related information. The marketplace service 106 may receive and store catalogue data 214 from individual benefit providers that offer their goods for sale on an electronic marketplace hosted by the marketplace service 106. Alternatively or in addition, the catalogue data 214 may be stored by the individual benefit providers, and made available to the list generation 114 upon request (e.g., via an API for requesting the catalogue data 214).

The benefit rules 216 may include sets of one or more rules for generating corresponding curated set of benefits. For example, for a farmers market themed membership, the membership data may identify a first rule specifying that the benefit must be a food item produced within a threshold distance of a location associated with the purchasing consumer, and a second rule specifying that food items that are in season for shorter periods are to be preferred over food items that are in season for longer periods. In this way, when event module 208 detects an event associated with the farmers market membership, the list generation engine 114 may generate a curated list of produce items that may be provided to the consumer based on the corresponding benefit rules 216. The benefit rules 216 may be input by a curator for a corresponding membership, by a consumer during purchase of a membership or individual benefit package, or a combination thereof. For example, a curator may submit a set of rules that lay the foundational framework for selecting curated benefits for a membership. Then, as part of the purchasing process of the membership, the purchasing consumer may be given the opportunity to add or adjust one or more rules to tailor the membership to fit their personal preferences.

The curation data 218 may include one or more itemized lists of benefits that correspond to individual selected benefit package memberships. The curated lists may be input into the marketplace service 106 by a curator, may be generated automatically by the marketplace system, or a combination thereof. For example, for selected benefit package corresponding to a particular celebrity, the celebrity may periodically input a set of benefits that they would like to include in the package. In some embodiments, a first portion of a curated list may be input by a curator, and a second portion of the curated list may be generated by the marketplace service (e.g., using one or more benefit rules 2016). In some embodiments, the curation data 218 may specify a schedule of benefits that may be provided to consumers at set intervals of a membership. The intervals may correspond to a benefit package progression (e.g., one or more benefits that may be included in a first package, second package, etc.), a benefit progression (e.g., a first benefit should only be provided when a second benefit has previously been provided), time periods at which particular benefits are to be provided (e.g., one or more benefits that may be provided in the first year of membership, in the month of January), or may be accomplishment driven (e.g., the consumer has transitioned from first grade to second grade, completed a video/game/course/task/project, etc.), or a combination thereof.

In some embodiments, the list generation engine(s) 114 may determine the curated set of benefits based on the catalogue data 214, the benefit rules 216, and the curation data 218. For example, when generating the curated set of benefits, the list generation engine 114 access one or more of the benefit rules 216 and the curation data 218. In some embodiments, the list generation engine 114 may access the catalogue data 214 to determine a set of curated benefits that meet the criteria of the benefit rules 216 and the curation data 218. For example, where the curation data 218 identifies a benefit schedule for new parents, and the benefit schedule identifies infant formula as being an appropriate benefit, the list generation engine 114 may search the catalogue data 214 to identify benefits that correspond to infant formula. The list generation module may search the catalogued data using one or more of a membership ID that corresponds to a selected benefit membership, a benefit category identifier, or other identifier that identifies qualifying benefits.

In some embodiments, the qualifying benefits may be ranked and/or scored. For example, the benefits may be scored based on availability (e.g., a low score for an item experiencing a shortage, a higher score for an item that marketplace service 106 has an excess of, etc.), merchant input (e.g., merchant requests that one or more particular items be included in the program), benefit ratings/reviews, marketplace performance (e.g., popular items scored higher), benefit history (i.e., time the benefit was introduced, monthly performance metrics for the benefit), etc. The qualifying benefits may be ranked and/or scored by a curator, a benefit provider, list generation engine 114, or another element of marketplace service 106. In some embodiments, the list generation engine 114 may select a set number of benefits, select benefits having a ranking and/or score above a threshold value, or a combination thereof, to be included in the curated set of benefits.

The list generation engine 114 may then provide the curated set of benefits and a consumer identifier to secure customization engine(s) 116. For example, the marketplace service 106 may transmit an encrypted request to the secure customization engine 116 over a secure internet connection. The encrypted request may pass the curated set of benefits (e.g., as a calendar, ordered list, etc.) and the consumer identifier. The secure customization engine 116 may then determines a personalized set of benefits that are tailored to the consumer that is to receive the benefit package. The secure customization engine 116 may be stored in a secure portion of memory 204, or it may be stored on a separate secure computing device. In some embodiments, there may be more than one secure customization engine that are able to perform customization of curated benefit lists. For example, different customization engines may apply different evaluation techniques to determine the personalized sets of benefits.

In some embodiments, that marketplace service 106 may employ a centralized service that manages the permissions and or ability of different services to communicate or otherwise interact with other services. For example, the encrypted request may be passed over the secure internet connection to the centralized service, which is then is able to authenticate the identities of both the marketplace service 106 and the secure customization engine 116, authorize the passage of the encrypted request to the secure customization engine 116, and log the transmission of the secure request in a transmission log.

The secure customization engine 116 may be able to securely access customer information 222 (e.g., behavior information, profile information, past purchase information, demographic information, geographic information, stated and/or determined consumer preferences, etc.). In this way, the secure customization engine 116 may use the consumer identifier to securely access consumer information 220 associated with the consumer that is receiving the benefit package, and may determine the personalized set of benefits based on the consumer information and the curated set of benefits. For example, the secure customization engine 116 may remove benefits that the consumer information indicates have been previously acquired by the consumer.

In some embodiments, secure customization engine 116 may include a scoring module 222 that scores or ranks one or more benefits of the curated set of benefits. For example, scoring module 222 may determine a predicted interest value for individual benefits based on the consumer information, and assign scores and/or rank individual benefits according to the predicted level of interest in the benefit. In some embodiments, scoring module 222 may apply a weight to the scores assigned to the curated set of benefits assigned by the list generation engine 114 based on the predicted level of interest in the benefit. In this way, the weighted score may be based on both secure consumer data that is only accessible to the secure customization engine, and other data (e.g., the catalogue data 214, the benefit rules 216, and the curation data 218) that is accessible to the list generation engine 114. The secure customization engine 116 may then generate a personalized ranking of benefits in the curated set of benefits based on the predicted level of interest of the consumer in the individual benefits. In some embodiments, the personalized set of benefits may be provided to the marketplace service via a secure response passed via the secure internet connection.

The benefit selection module 210 can be executable by the one or more processing units 106 to receive the personalized set of benefits from the secure customization engine 116, and select the benefits that are to be included in the selected benefit package. The benefit selection module 210 may select individual benefits based on corresponding score(s), and/or a ranking of the personalized set of benefits. The benefit selection module 210 may select benefits based on a comparison between corresponding scores, by a comparison between a score and a threshold value, or a combination thereof. For example, the benefit selection module 210 may select the three benefits that have the highest corresponding score. In another example, the benefit selection module 210 may only select benefits that have a score that exceeds a threshold value. In some cases, this would mean that the benefit selection module 210 may determine that no benefits are to be provided to the consumer in situations where no benefit has been identified by the secure customization engine 116 as having a sufficient level of predicted consumer interest. In such situations, the marketplace service 106 may provide a consumer with a notification that no benefit package will be provided.

In some embodiments, benefit selection module 210 may select a present number of benefits for inclusion in the benefits package (e.g., a number indicated in membership data associated with the corresponding membership). Alternatively or in addition, benefit selection module 210 may select the one or more benefits based on a number of other factors, such as total price of the benefits in the benefits package (i.e., less than a preset value, within a value range, etc.), a size of the container within which the benefits package is being shipped, a diversity of types of benefits within the benefit package (e.g., at least one physical item and one digital item), a required set of benefit categories, etc. For example, for a STEM themed membership program for young children, the benefit selection module 210 may select a highest scored STEM themed toy, a highest scored STEM themed book, and two highly scored STEM themed videos.

The interaction module 212 can be executable by the one or more processing units 106 to transmit and receive interaction events with the consumer who purchased the consumer selected benefits package. For example, the interaction module 212 may provide a consumer (via electronic communication with a computing device associated with the consumer) with the ability to select between two or more similar benefits that have each been highly scored. The interaction module 212 may also receive feedback from the consumer about the benefit package. The feedback may include benefit reviews, package reviews, benefit ratings, returns of one or more benefits, cancellation of a membership, etc. The interaction module 212 may update the customer information 220 based on the interactions and/or feedback. For example, in response to the consumer submitting a negative review for a product, the interaction module 212 may adjust the consumer information 220 so that it better reflects the preferences of the server.

The marketplace service 106 may then generate order information 214 for the consumer benefit package. The marketplace service 106 may then transmit order information 214 to individual merchants and/or fulfillment centers that are providing one or more goods (e.g., other marketplace platforms 110). For example, the marketplace service 106 may provide an order document to a physical fulfillment center for the fulfillment of one or more physical goods, and to a digital fulfillment for fulfillment of one or more digital goods. In some embodiments, the order information 214 may include one or more order documents that identify the benefits that are to be provided in the benefit package, prices to be charged for individual benefits, providers that are to provide individual benefits, consumer billing information, a shipping address, etc. In this way, the order information 214 would allow the merchants and/or fulfillment centers to identify the benefits that are to be provided to the consumer, and determine how those benefits are to be provided to the consumer (i.e., shipped to a package assembly center, have digital access rights granted to a user account, emailed to a consumer, etc.). The order information may also include an order identifier that can be used to access an order document stored by the marketplace service 106. Alternatively, marketplace service 106 may transmit an order identifier to the individual merchants that are providing one or more goods, and store the order documents in a location that is accessible to the individual merchants using the order identifier.

Those skilled in the art will appreciate that the architecture described in association with marketplace service 106 is merely illustrative and is not intended to limit the scope of the present disclosure. In particular, the computing system and devices may include any combination of hardware or software that can perform the indicated functions, including computers, network devices, internet appliances, and/or other computing devices. The marketplace service 106 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The one or more processing unit(s) 202 may be configured to execute instructions, applications, or programs stored in the memory 204. In some examples, the one or more processing unit(s) 202 may include hardware processors that include, without limitation, a hardware central processing unit (CPU), a graphics processing unit (GPU), and so on. While in many instances the techniques are described herein as being performed by the one or more processing units 202, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 204 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer-executable instructions that, when executed by one or more processing units, cause various functions and/or operations described herein to be performed.

Additionally, a computer media includes data stored within a modulated data signal. For example, a computer media may include computer readable instructions, data structures, program modules, modulated carrier waves, other modulated transmission mechanisms, etc. However, as defined herein, computer storage media does not include communication media.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from marketplace service 106 may be transmitted to marketplace service 106 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Additionally, the network interface 206 includes physical and/or logical interfaces for connecting the respective computing device(s) to another computing device or network. For example, the network interface 206 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

FIGS. 3 and 4 are flow diagrams of illustrative processes illustrated as a collection of blocks in a logical flow graph, which represent a sequence of operations that can be implemented in hardware, software, or a combination thereof. The blocks are organized under entities and/or devices that may implement operations described in the blocks. However, other entities/devices may implement some blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 for identifying customized selected benefits while protecting consumer information. The process 300 may be implemented by the computing architecture 200 and in the environment 100 described above, or in other environments and architectures.

At 302, marketplace service 106 detects an event associated with a consumer. An event may correspond to an indicator that a consumer has purchased a selected benefit package. Alternatively, an event may correspond to an indicator of an occurrence of a pre-scheduled interval (e.g., one a day, twice a month, biannually, etc.) at which a selected benefit package should be sent to a consumer. For example, where a consumer has purchased a membership in a monthly benefit package, the marketplace service 106 will detect a corresponding event each month, and will trigger the process of building a new benefit package for the consumer.

At 304, marketplace service 106 identifies a set of curated benefits. In some embodiments, marketplace service 106 may determine the curated set of benefits based on catalogue data, one or more benefit rules, and/or one or more curated lists. The catalogue data may identify benefits offered by the marketplace service 106, and/or other marketplace platforms. For example, the catalogue data may include benefits that are offered, information about the benefits (e.g., descriptions, prices, current sales, etc.), availability of the benefits (e.g., amount in stock, seasonal availability, etc.), and as well as other benefit related information.

The benefit rules may include sets of one or more rules for generating corresponding curated set of benefits. For example, for a family game night benefit package, corresponding benefit rules may specify that qualifying games must be for children 12 years old or older, that games included in the benefit package should be for 4 or more players, and that the benefit package is to not include puzzles. In this way, when marketplace service 106 detects an event associated with the family game night benefit package, it may generate a curated list of potential games that may be provided to the consumer based on the corresponding benefit rules. The curated lists may include one or more itemized lists of benefits that have been previously selected for potential inclusion in benefit packages. The curated lists may be input into the marketplace service 106 by a curator, may be generated automatically by the marketplace system, or a combination thereof.

At 306, marketplace service 106 transmits the set of curated benefits and a consumer identifier to secure customization engine 116. For example, the marketplace service 106 may submit the set of curated benefits and the consumer identifier via an API (application programing interface). In some embodiments, the marketplace service 106 may also transmit an order identifier associated with the event. The consumer identifier may correspond to a consumer ID, consumer account identifier, or other piece of data that expresses the identity of the consumer.

At 308, secure customization engine 116 accesses consumer data associated with the consumer. For example, secure customization engine 116 may be able to securely access customer information (e.g., behavior information, profile information, past purchase information, demographic information, geographic information, stated and/or determined consumer preferences, etc.). In this way, the secure customization engine 116 may use the consumer identifier to securely access consumer information associated with the consumer that is receiving the benefit package, and may determine the personalized set of benefits based on the consumer information and the curated set of benefits.

At 310, secure customization engine 116 scored one or more benefits of the first set of curated benefits. For example, secure customization engine 116 may determine a predicted interest value for individual benefits based on the consumer information, and assign scores and/or rank individual benefits according to the predicted level of interest in the benefit. In some embodiments, secure customization engine 116 may assign a weight to the scores previously assigned to the curated set of benefits assigned by the marketplace service 106 based on the predicted level of interest in the benefit. Alternatively or in addition, secure customization engine 116 may generate a personalized ranking of benefits in the curated set of benefits based on the predicted level of interest of the consumer in the individual benefits.

At 312, secure customization engine 116 generates a personalized set of benefits. For example, secure customization engine 116 may select individual benefits based on corresponding score(s), and/or a ranking of the personalized set of benefits. In some embodiments, secure customization engine 116 may select a present number of benefits for inclusion in the benefits package. Alternatively or in addition, secure customization engine 116 may remove benefits that the consumer information indicates have already been provided to the consumer.

At 314, secure customization engine 116 transmits the personalized set of benefits to the marketplace service 106. For example, the secure customization engine 116 may submit the personalized set of benefits to the marketplace service 106 via an API. In some embodiments, secure customization engine 116 may transmit the personalized set of benefits in association with the order identifier.

At 316, marketplace service 106 selects one or more benefits to be provided to the consumer. For example, marketplace service 106 may select individual benefits based on corresponding score(s), and/or a ranking of the personalized set of benefits. In some embodiments, marketplace service 106 may select the benefits to include in the benefits package based on one or more of a present number of benefits, a total price of the benefits in the benefits package, a size of the container within which the benefits package is being shipped, a diversity of types of benefits within the benefit, a required set of benefit categories, etc.

FIG. 4 is a flow diagram of an illustrative process 400 for utilizing consumer interactions to generate customized selected benefits while protecting consumer information. The process 400 may be implemented by the computing architecture 200 and in the environment 100 described above, or in other environments and architectures.

At 402, marketplace service 106 detects an event associated with a consumer. An event may correspond to an indicator that a consumer has purchased a selected benefit package. Alternatively, an event may correspond to an indicator of an occurrence of a pre-scheduled interval (e.g., one a day, twice a month, biannually, etc.) at which a selected benefit package should be sent to a consumer.

At 404, marketplace service 106 identifies a set of curated benefits. In some embodiments, marketplace service 106 may determine the curated set of benefits based on catalogue data, one or more benefit rules, and/or one or more curated lists. The catalogue data may identify benefits offered by the marketplace service 106, and/or other marketplace platforms. The benefit rules may include sets of one or more rules for generating corresponding curated set of benefits. The curated lists may include one or more itemized lists of benefits that have been previously selected for potential inclusion in benefit packages. The curated lists may be input into the marketplace service 106 by a curator, may be generated automatically by the marketplace system, or a combination thereof.

At 406, secure customization engine 116 accesses consumer data associated with the consumer. For example, secure customization engine 116 may use a consumer identifier to securely access customer information (e.g., behavior information, profile information, past purchase information, demographic information, geographic information, stated and/or determined consumer preferences, etc.

At 408, secure customization engine 116 scored one or more benefits of the first set of curated benefits. For example, secure customization engine 116 may determine a predicted interest value for individual benefits based on the consumer information, and assign scores and/or rank individual benefits according to the predicted level of interest in the benefit. In some embodiments, secure customization engine 116 may assign a weight to the scores previously assigned to the curated set of benefits assigned by the marketplace service 106 based on the predicted level of interest in the benefit. Alternatively or in addition, secure customization engine 116 may generate a personalized ranking of benefits in the curated set of benefits based on the predicted level of interest of the consumer in the individual benefits.

At 410, secure customization engine 116 generates a personalized set of benefits. For example, secure customization engine 116 may select individual benefits based on corresponding score(s), and/or a ranking of the personalized set of benefits. In some embodiments, secure customization engine 116 may select a present number of benefits for inclusion in the benefits package. Alternatively or in addition, secure customization engine 116 may remove benefits that the consumer information indicates have already been provided to the consumer.

At 412, marketplace service 106 selects one or more benefits to be provided to the consumer. For example, marketplace service 106 may select individual benefits based on corresponding score(s), and/or a ranking of the personalized set of benefits. In some embodiments, marketplace service 106 may select the benefits to include in the benefits package based on one or more of a present number of benefits, a total price of the benefits in the benefits package, a size of the container within which the benefits package is being shipped, a diversity of types of benefits within the benefit, a required set of benefit categories, etc.

At 414, marketplace service 106 transmits a consumer selection/input interface to a consumer computing device associated with the consumer. For example, the interface may provide the consumer with the ability to select between two or more similar benefits that have been highly scored. Alternatively or in addition, the interface may indicate the benefits that have been selected for inclusion in the curated benefit package, and may provide functionality to add or replace individual benefits. For example, in response to consumer input to remove a particular benefit, the interface may provide one or more alternative benefits from the personalized set of benefits. In some embodiments, the alternative benefits may be provided based on an associated score, weight, ranking, or a combination thereof.

At 416, consumer computing device 102 receives a selection of a benefit option and/or consumer input. For example, consumer computing device 102 may receive a input corresponding to the selection of an individual benefit of two or more potential benefits. The consumer computing device 102 may also receive consumer input corresponding to a new rule. For example, the consumer may indicate that none of the benefits included in the package should cost more than $15.

At 418, marketplace service 106 finalizes the selected benefit package for the consumer. For example, marketplace service 106 may generate an order document for the consumer benefit package that identifies the benefits that are to be provided in the benefit package, prices to be charged for individual benefits, providers that are to provide individual benefits, consumer billing information, a shipping address, etc. The marketplace service may then provide the order document to one or more fulfillment centers for aggregation of benefits, packing of the benefits package, and shipment. Alternatively, marketplace service 106 may store the order document in a secure memory location that is accessible by the one or more fulfillment centers using an order identification number.

FIGS. 5A and 5B are example illustrations 500 and 550 of methods for generating customized selected benefits to consumers while protecting consumer information. FIG. 5A illustrates the process 500 of generating a set of one or more benefits for a selected benefit package. FIG. 5A depicts an event 502 that indicates that a selected benefit package is to be generated for month 7 out of 9 of a pregnancy benefit package. Event 502 further indicates a consumer identifier associated with the consumer that is to receive the benefit package.

FIG. 5A further depicts a set of one or more benefits 504 that is generated by list generation engine 114 for potential inclusion in the selected benefit package is to be generated for month 7 out of 9 of a pregnancy benefit package. In some embodiments, individual benefits of the set of one or more benefits 504 may be scored by the list generation engine 114. FIG. 5A further shows sample catalogue data 214, benefit rules 216, and a curation data 218 that may be used by the list generation engine to generate the a set of one or more benefits 504 and/or score the individual benefits. For example, set of one or more benefits 504 does not include the newborn guidebook "Dr. Bob's Third Trimester Guide" because catalogue data 214 indicates that the book is not in stock. Additionally, set of one or more benefits 504 depicts a relatively lower score for "Generic Natal Pills" because benefit rules 216 indicate that the consumer requested that brand name vitamins be preferred to generic vitamins.

FIG. 5B illustrates the process 550 of generating a set of personalized benefits for a selected benefit package using a secure customization engine. FIG. 5B depicts set of one or more benefits 504 and consumer identifier 506 being provided to secure customization engine 116. The set of one or more benefits 504 and consumer identifier 506 may be passed to the secure customization engine 116 via an API exposed by the secure customization engine.

FIG. 5B further depicts a set of personalized benefits 508 that has been customized by the secure customization engine 116. FIG. 5B also depicts customer data 510 that may be used by the secure customization engine 116 to generate the personalized benefits 508. For example, the book "Modern Nesting" is not included in the personalized benefits 508 because customer data 510 indicates that the consumer has already received this book. FIG. 5B depicts secure customization engine 116 acting as a black box module that returns personalized benefits 508 without exposing customer data to the list generation engine 114 or other elements of the marketplace service. In this way, the marketplace service is able to receive the personalized benefits without requiring permissions to access secure data. Additionally, this allows list generation engine 114 to be created without requiring an acquisition of consumer data 510, or that the list generation engine 114 having to include security protocols to safeguard such consumer data 510.

In some embodiments, individual benefits of the personalized benefits 508 may be scored by the secure customization engine 116 using the customer data 510. Alternatively, where the set of one or more benefits 504 includes scores for the individual benefits, the secure customization engine 116 may determine a weighted score that takes into account customer data 510. For example, personalized benefits 508 shows a high weighted score because customer data 510 shows that the consumer's past behavior has indicated a preference for the vitamin brand Mother Nature.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computing system for providing service selected benefits comprising:
   one or more processing units; and
   memory storing computer-executable instructions executable by the one or more processors to perform operations comprising:
      detecting an event associated with an acquisition of a benefit package;
      determining, by a list generation engine and in response to the event, at least a first benefit and a second benefit selected for inclusion as part of the benefit package;
      providing, by the list generation engine, the first benefit, the second benefit, and a recipient identifier corresponding to a recipient associated with the benefit package to a secure customization engine configured to access secure recipient transaction history associated with the recipient identifier;
      receiving, from the secure customization engine and based at least in part on the secure recipient transaction history, a first score corresponding to a first predicted level of interest in the first benefit and a second score corresponding to a second predicted level of interest in the second benefit; and
      selecting, without access to the secure recipient transaction history, the first benefit for inclusion in the benefit package based at least in part on the first score and the second score.

2. The computing system as recited in claim 1, wherein the benefit package is associated with a benefit program, and determining the first benefit and the second benefit comprises:
   accessing a curation data associated with the benefit program, the curation data specifying one or more sets of benefits available to be provided at different times; and
   selecting the first benefit and the second benefit based at least in part on the curation data.

3. The computing system as recited in claim 1, wherein the benefit package is associated with a benefit program, and determining the first benefit and the second benefit comprises:
   accessing curation data associated with the benefit program, the curation data specifying one or more rules for identifying benefits for the benefit package;
   accessing catalogue data associated with a marketplace service, the catalogue data identifying benefits offered by the marketplace service; and
   selecting the first benefit and the second benefit based at least in part on the curation data and the catalogue data.

4. The computing system as recited in claim 1, wherein the benefit package is associated with a benefit program, and the operations further comprise selecting, the list generation engine from a set of two or more list generation engines based at least in part on the benefit program.

5. A computer-implemented method comprising:
   detecting an event associated with a benefit package;
   determining, based at least in part on the event, a first benefit associated with the benefit package and a second benefit associated with the benefit package;
   providing at least the first benefit, the second benefit, and a recipient identifier associated with the event to a secure customization engine, wherein the secure customization engine is able to access secure recipient data associated with the recipient;
   receiving, from the secure customization engine and based at least in part on the secure recipient data, a first predicted level of interest in the first benefit and a second predicted level of interest in the second benefit; and
   selecting the first benefit for inclusion in the benefit package based at least in part on the first predicted level of interest and the second predicted level of interest.

6. The computer-implemented method of claim 5, wherein the event is associated with a benefit program where benefit packages are provided to the recipient at set intervals.

7. The computer-implemented method of claim 6, wherein determining the first benefit and the second benefit comprises:
   accessing a curation data specifying one or more sets of benefits that may to be provided at corresponding intervals; and
   selecting the first benefit and the second benefit based at least in part on the curation data.

8. The computer-implemented method of claim 6, the event is a first event, the benefit package is a first benefit package, and further comprising:
   detecting a second event associated with a second package for the benefit program;
   determining, based at least in part on the second event, a third benefit associated with the benefit program and a fourth benefit associated with the benefit program;
   providing the third benefit, the fourth benefit, and the recipient identifier associated with the event to the secure customization engine;
   receiving, from the secure customization engine and based at least in part on the secure recipient data, a third predicted level of interest in the third benefit and a fourth predicted level of interest in the fourth benefit; and
   selecting the third benefit for inclusion in the second benefit package based at least in part on the third predicted level of interest and the fourth predicted level of interest.

9. The computer-implemented method of claim 5, wherein determining the first benefit and the second benefit comprises:
   accessing curation data specifying one or more rules for identifying benefits for the benefit package;
   accessing catalogue data identifying benefits offered by a marketplace service; and
   selecting the first benefit based at east in part on the curation data and the catalogue data.

10. The computer-implemented method of claim 9, further comprising:
    receiving, from a recipient device associated with recipient, a request to obtain the benefit package; and
    receiving, from the recipient device, the one or more rules for identifying benefits for the benefit package.

11. The computer-implemented method of claim 9, wherein the marketplace service is a first marketplace service, and determining the first benefit and the second benefit further comprises:
    accessing second catalogue data identifying benefits offered by a second marketplace service; and
    selecting the second benefit based at least in part on the curation data and the second catalogue data.

12. The computer-implemented method of claim 5, wherein the benefit package includes at least one of a physical item, a certificate for a service, or a certificate for a digital item, and the method further comprising selecting a list generation engine from a set of two or more list generation engines based at least in part on the benefit package.

13. The computer-implemented method of claim 5, further comprising:
   transmitting, to a recipient device associated with recipient, an option to select between the first benefit and a third benefit;
   receiving from the recipient device, a selection of the first benefit; and
   wherein selecting the first benefit for inclusion in the benefit package further based at least in part on the selection.

14. One or more computer-readable media storing executable instructions that, when executed, cause one or more computing devices to perform acts comprising:
   detecting an event associated with a benefit package;
   determining, based at least in part on the event, a first benefit associated with the benefit package and a second benefit associated with the benefit package;
   providing at least the first benefit, the second benefit, and a recipient identifier associated with the event to a secure customization engine, wherein the secure customization engine is able to access secure recipient data associated with the recipient;
   receiving, from the secure customization engine and based at least in part on the secure recipient data, a first predicted level of interest in the first benefit and a second predicted level of interest in the second benefit; and
   selecting the first benefit for inclusion in the benefit package based at least in part on the first predicted level of interest and the second predicted level of interest.

15. The one or more computer-readable media of claim 14, wherein the event is associated with a benefit program where benefit packages are provided to the recipient at set intervals.

16. The one or more computer-readable media of claim 15, wherein determining the first benefit and the second benefit comprises:
   accessing a curation data specifying one or more sets of benefits that may to be provided at corresponding intervals; and
   selecting the first benefit and the second benefit based at least in part on the curation data.

17. The one or more computer-readable media of claim 15, the event is a first event, the benefit package is a first benefit package, and wherein the acts further comprise:
   detecting a second event associated with a second package for the benefit program;
   determining, based at least in part on the second event, a third benefit associated with the benefit program and a fourth benefit associated with the benefit program;
   providing the third benefit, the fourth benefit, and the recipient identifier associated with the event to the secure customization engine;
   receiving, from the secure customization engine and based at least in part on the secure recipient data, a third predicted level of interest in the third benefit and a fourth predicted level of interest in the fourth benefit; and
   selecting the third benefit for inclusion in the second benefit package based at least in part on the third predicted level of interest and the fourth predicted level of interest.

18. The one or more computer-readable media of claim 14, wherein determining the first benefit and the second benefit comprises:
   accessing curation data specifying one or more rules for identifying benefits for the benefit package;
   accessing catalogue data identifying benefits offered by a marketplace service; and
   selecting the first benefit based at least in part on the curation data and the catalogue data.

19. The one or more computer-readable media of claim 18, wherein the acts further comprise:
   receiving, from a recipient device associated with recipient, a request to obtain the benefit package; and
   receiving, from the recipient device, the one or more rules for identifying benefits for the benefit package.

20. The one or more computer-readable media of claim 18, wherein the marketplace service is a first marketplace service, and determining the first benefit and the second benefit further comprises:
   accessing second catalogue data identifying benefits offered by a second marketplace service; and
   selecting the second benefit based at least in part on the curation data and the second catalogue data.

* * * * *